(12) United States Patent
Liu et al.

(10) Patent No.: US 10,638,863 B2
(45) Date of Patent: *May 5, 2020

(54) KNIFE BLOCK WITH STORAGE SLOT BLADE SHARPENERS AND CUTLERY SET USING SAME

(71) Applicant: Calphalon Corporation, Atlanta, GA (US)

(72) Inventors: Andrew Q. Liu, Alpharetta, GA (US); Steven J. Muske, Marietta, GA (US)

(73) Assignee: Calphalon Corporation, Atlanta, GA (US)

(*) Notice: Subject to any disclaimer, the term of this patent is extended or adjusted under 35 U.S.C. 154(b) by 95 days.

This patent is subject to a terminal disclaimer.

(21) Appl. No.: 15/481,506

(22) Filed: Apr. 7, 2017

(65) Prior Publication Data

US 2017/0208978 A1 Jul. 27, 2017

Related U.S. Application Data

(63) Continuation of application No. 14/320,100, filed on Jun. 30, 2014, now Pat. No. 9,693,644.

(51) Int. Cl.
| | |
|---|---|
| *A47G 21/14* | (2006.01) |
| *B24B 3/54* | (2006.01) |
| *B24D 15/08* | (2006.01) |
| *A47J 47/16* | (2006.01) |
| *A47F 7/00* | (2006.01) |

(52) U.S. Cl.
CPC ............. *A47G 21/14* (2013.01); *A47J 47/16* (2013.01); *B24B 3/54* (2013.01); *B24D 15/081* (2013.01); *B24D 15/084* (2013.01); *A47F 7/00* (2013.01); *B24D 15/08* (2013.01)

(58) Field of Classification Search
CPC ........ B24B 3/54; B24D 15/08; B24D 15/084; A47F 7/00; A47G 21/14; A47J 47/16
USPC .................................................. 30/298.4, 138
See application file for complete search history.

(56) References Cited

U.S. PATENT DOCUMENTS

| 3,676,961 | A | * | 7/1972 | Jackson | ................ | B26B 29/025 |
|---|---|---|---|---|---|---|
| | | | | | | 451/555 |
| 4,604,836 | A | * | 8/1986 | Huang | ................. | B24D 15/084 |
| | | | | | | 30/138 |
| 4,693,439 | A | * | 9/1987 | Hahn | ...................... | G09F 23/06 |
| | | | | | | 248/300 |
| 4,866,845 | A | * | 9/1989 | McEvily | ................ | A47G 21/14 |
| | | | | | | 30/138 |

(Continued)

*Primary Examiner* — Ghassem Alie
*Assistant Examiner* — Nhat Chieu Q Do
(74) *Attorney, Agent, or Firm* — Eversheds Sutherland (US) LLP

(57) ABSTRACT

A knife block may include a block body with a recessed portion and a block insert positioned at least partially within the recessed portion. The block insert may include a first knife slot and a second knife slot. The knife block may include a first knife sharpener coupled to the block insert, where the first knife slot is sized such that a first knife is sharpened by the first knife sharpener each time the first knife is removed from the first knife slot, and a second knife sharpener coupled to the block insert, where the second knife slot is sized such that a second knife is sharpened by the second knife sharpener each time the second knife is removed from the second knife slot. The knife block may include a first knife storage slot and a second knife storage slot.

31 Claims, 11 Drawing Sheets

(56) References Cited

U.S. PATENT DOCUMENTS

| | | | | |
|---|---|---|---|---|
| 7,228,632 B2 * | 6/2007 | Fedor | ........................ | B26B 3/00 |
| | | | | 30/147 |
| 8,590,427 B2 * | 11/2013 | Murphy | ................ | B26B 29/025 |
| | | | | 76/82 |
| 2005/0205506 A1 | 9/2005 | Siegel | | |
| 2008/0173772 A1 | 7/2008 | Welch | | |
| 2012/0266468 A1 * | 10/2012 | Murphy | ................. | A47G 21/14 |
| | | | | 30/298.4 |

* cited by examiner

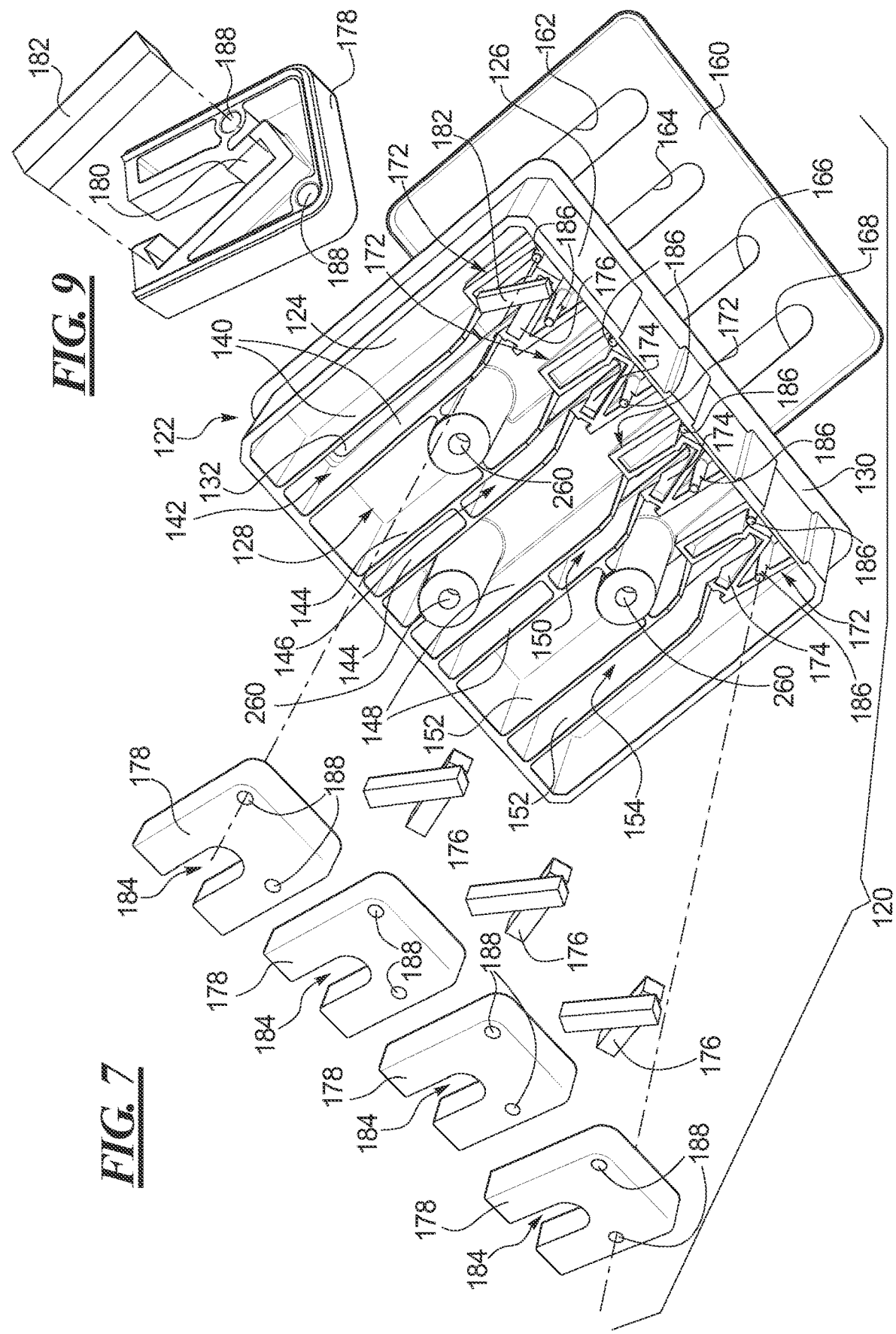

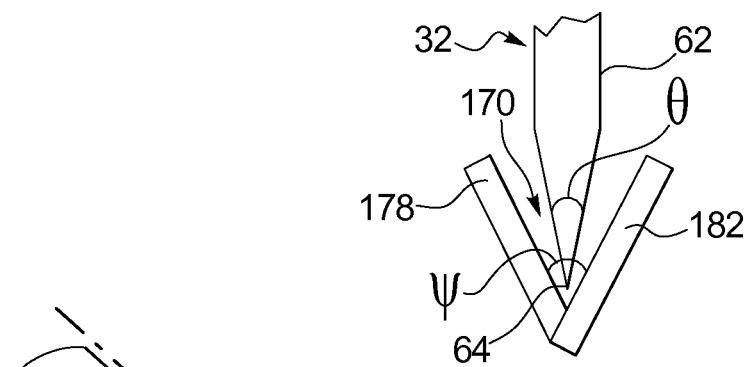
*FIG. 10C*
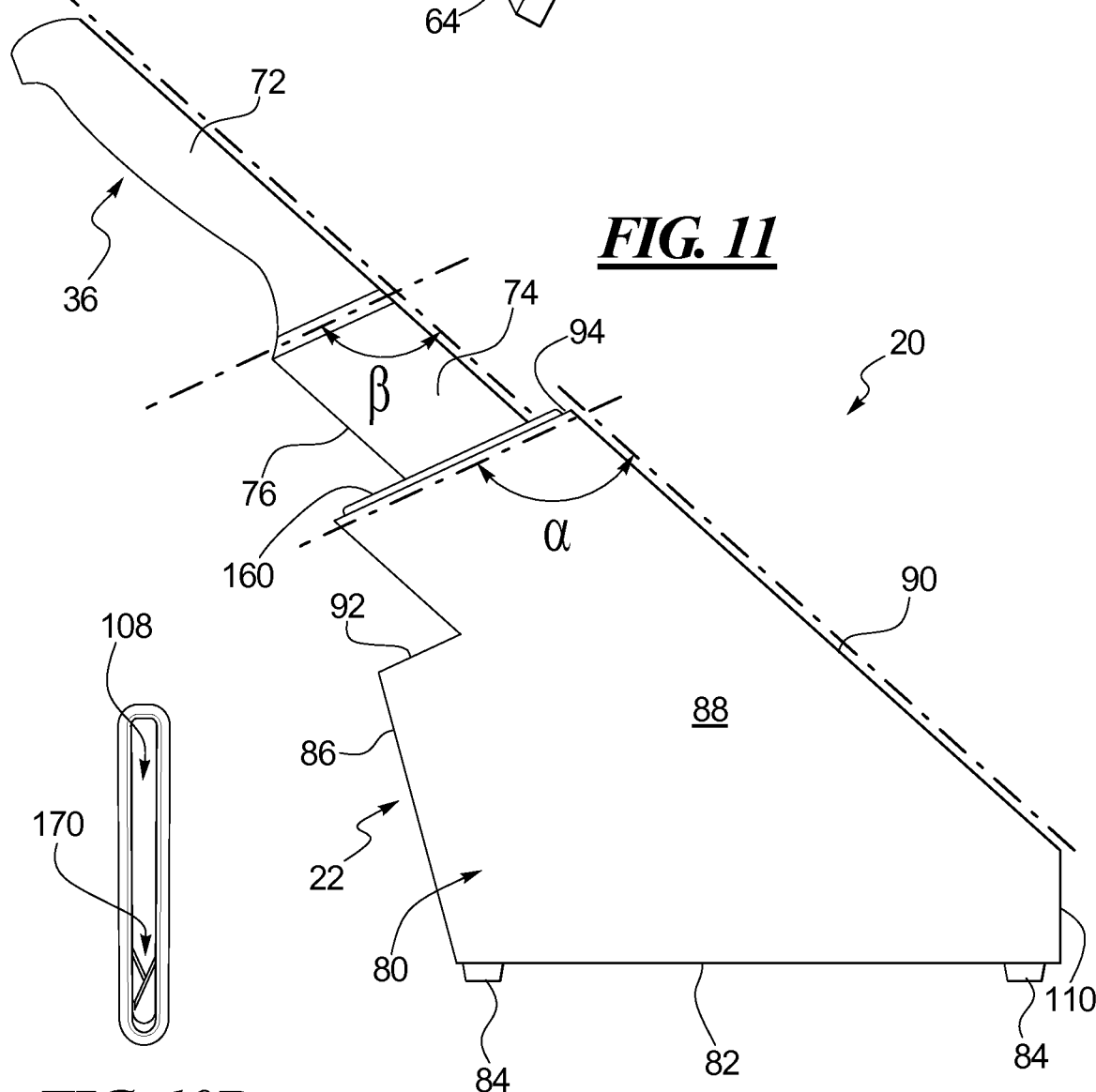
*FIG. 11*
*FIG. 10B*

KNIFE BLOCK WITH STORAGE SLOT BLADE SHARPENERS AND CUTLERY SET USING SAME

BACKGROUND

1. Field of the Disclosure

The present disclosure generally relates to cutlery implements and knife blocks and more particularly to a knife block with a storage slot having a sharpener positioned to contact a knife blade stored in the storage slot.

2. Description of Related Art

Knives of many types are well known and typically have a blade with a cutting edge along at least one edge of the blade. The cutting edge of the knife blade on most knives becomes dull over time and as a result of using the knife Dulling of the cutting edge may result from a wide range of use conditions. For example, the cutting edge of a knife blade may become dull through improper use, such as by using the knife to cut objects on hard surfaces such as glass cutting boards or granite counter tops. Also, a cutting edge of a knife blade may become dull simply through normal wear from everyday use of the knife.

In order to maintain the cutting edge on most knives, the blade must be sharpened periodically. How often one sharpens the blade, i.e., sharpening frequency, depends on when the user recognizes that it is time to sharpen the blade and whether the user remembers or bothers to take the time to do so. This can be problematic because some users will not take the time to sharpen a blade even when they do recognize the need. Other users may not even recognize the need to sharpen a blade and thus will not do so.

A further problem is that many users will use improper technique when sharpening a knife Some users may not know the proper techniques or may not know the proper tools to use for sharpening a knife, may not have the proper tools available in order to properly sharpen a knife, or both. Other users may know the proper tools to use, may have them at hand, and may even know the proper techniques. However, many of these users may not have the patience or the skill necessary to properly sharpen a knife. The most common method of maintaining a cutting edge on a knife blade is to use honing steel to "hone" the knife edge. Honing essentially just realigns the very tip of the edge at a very small scale to improve cutting ability. Sharpening removes material to put a new edge on the knife. Honing a knife edge using honing steel still requires that the user recognizes when to hone a knife, remembers to hone the knife blade cutting edge, and does so properly. If the user does not recognize when to hone a blade, does not remember to do so, does so too infrequently, or does so improperly, the user can damage the cutting edge and the knife blade. The same is true for sharpening a knife blade.

Commonly known methods that have been devised to address these problems also have their own disadvantages. Some cutlery sets include a product that utilizes honing steel and that is provided with the set. This is a particularly common solution and many cutlery sets include a knife block, a set of knives, and a removable, elongate honing steel element. The honing steel is often provided with its own storage slot in the block. However, this method relies heavily on the consumer or end user with regard to frequency of honing and the technique used. This also does not sharpen the blade. Many users do not know how to hone a knife blade using a piece of honing steel, much less how to sharpen the blade using other techniques, and many also may not have the skill necessary to do so properly. As noted above, honing a cutting edge of a knife blade does not technically sharpen the cutting edge. Instead, the technique primarily is just used as a technique to re-align or straighten the cutting edge of the knife.

Others have developed off-the-shelf sharpeners for sharpening the cutting edge of knives. The end user must typically purchase the sharpener because this type of product does not come with the knife set or the cutlery set. Many of these types of sharpeners utilize both a carbide sharpener and a ceramic sharpener. The user is supposed to first use the carbide sharpener, which is the more aggressive of the two sharpeners, and then finish using the ceramic sharpener. However, these sharpeners again require that the user remember to sharpen the knife and to know how to use the product. This product may, however, reduce the possibility that the user employs improper technique. These types of sharpeners are typically sold independent of the knives that are ultimately to be sharpened. Thus, it sometimes occurs that the user purchases a sharpener that is a mismatch for their knives, i.e., a mismatch in the angles of the sharpener elements compared to the angles on the blades of the knives themselves. Electric versions of these types of sharpeners also exist in the marketplace, but the same problems still arise.

Others take their knives to a trained professional for sharpening. This technique requires the user to take or send their knives to the professional. A professional may use the above methods, devices, and techniques, but should do so properly. However, this still requires the user to know or decide when to have their knives sharpened and requires the extra effort to get the knives to the professional. Having a professional sharpen one's knives is also typically quite costly. The cost may inhibit the user from having their knives sharpened when it would otherwise be the right time to do so. The cost can be prohibitive because many professionals still sharpen knives by hand on a belt or rotary sander, which is akin to the processes used to originally manufacture the knife. Such time consuming skilled labor is often quite expensive. Most users will not have their knives professionally sharpened at all, or will do so only very infrequently because of the necessary time and expense.

Some cutlery sets have been produced that have a knife block and one dedicated sharpening slot in the block. The sharpening slot is not used to house or store a knife. Instead, when a user decides that a knife should be sharpened, the user then takes the knife, inserts it into the sharpening slot, and moves the knife back and forth across the sharpener in the sharpening slot. This method still relies on the consumer or user to determine when to sharpen a knife and then to remember to do so. The typical sharpening slot on these types of products is also a one-size-fits-all slot for the entire set of knives provided with the knife block. The slot must be sized to fit the largest knife in the set. This can make the sharpener less than optimal for sharpening the smaller knives in the set and can make the sharpener less than optimal for even the larger knives of the cutlery set.

SUMMARY

In one example according to the teachings of the present disclosure, a knife block has a block body and a plurality of knife storage slots extending into the block body. A first knife sharpener is aligned with a first slot of the plurality of knife storage slots and a second knife sharpener is aligned with a second slot of the plurality of knife storage slots. The first and second knife sharpeners are each configured to contact a blade of a knife stored in the corresponding first and second slots.

In one example, the first knife sharpener can be positioned to contact a cutting edge of the blade when a knife is inserted into the first slot, withdrawn from the first slot, or both, and the second knife sharpener can be positioned to contact a cutting edge of the blade when a knife is inserted into the second slot, withdrawn from the second slot, or both.

In one example, the first slot and the second slot can each have the same length into the block body. In one example, the first and second slots can each extend completely through the block body.

In one example, the first slot can have a different width across the block body than the second slot.

In one example, the first slot can have a different height along the block body than the second slot.

In one example, the first slot can be oriented lengthwise at a first angle within the block body relative to a horizontal reference and the second slot can be oriented lengthwise at a second angle within the block body relative to the horizontal reference. The first and second angles can each be between about 40 degrees and about 55 degrees. The first and second angles can be the same or can be different from one another. In one example, the first angle and the second angle can each be about 52.5 degrees.

In one example, the knife block can have at least a third knife sharpener along a third slot of the plurality of knife storage slots. The third knife sharpener can be configured to contact a blade of a knife stored in the third slot. Each of the first, second, and third slots can have at least a length into the block body, a width across the block body, and/or a height along the block body that is different than the other of the first, second, and third slots.

In one example, at least one slot of the plurality of knife storage slots does not have a knife sharpener aligned with the at least one slot.

In one example, the knife block can also include a recess in a face of the block body and at least the first and second slots can open into the recess. A block insert can be mounted in the recess. A first sub-slot and a second sub-slot can be formed through the block insert. The first sub-slot can be aligned with both the first knife sharpener and the first slot, and the second sub-slot can be aligned with both the second knife sharpener and the second slot. The first and second knife sharpeners can be carried by the block insert.

In one example, the knife block can include first and second indicia on a surface of the block body. The first indicia can be associated with a first opening into the first slot and the second indicia can be associated with a second opening into the second slot. The first and second indicia can relate to one or more knife characteristics and the first indicia can be different than the second indicia.

In one example according to the teachings of the present disclosure, a cutlery set has a knife block with a block body and at least a first storage slot and a second storage slot each extending into the block body from a face of the block body. At least a first knife sharpener is aligned with the first storage slot and a second knife sharpener is aligned with the second storage slot. A first knife has a first blade and a first handle and a second knife has a second blade and a second handle. The first storage slot is sized to receive the first blade and the second storage slot is sized to receive the second blade. The first knife sharpener can contact and sharpen a knife edge of the first blade when the first knife is inserted into or withdrawn from the first slot and the second knife sharpener can contact and sharpen a knife edge of the second blade when the second knife is inserted into or withdrawn from the second slot.

In one example, the first storage slot has at least one size characteristic that can be different from the like size characteristic of the second storage slot.

In one example, at least one size characteristic of the first storage slot can be different from the like size characteristic of the second storage slot. The size characteristics can be one or more of a length into, a width across, and/or a height along the block body.

In one example, the first storage slot can be oriented at a first angle relative to a horizontal reference and the second storage slot can be oriented at a second angle relative to the horizontal reference. In one example, the first and second angles can be different or can be the same. In one example, the first and second angles can be between about 40 degrees and about 55 degrees relative to the horizontal reference. In one example, the first and second angles can be between 50 degrees and 55 degrees relative to the horizontal reference.

In one example, the first blade can have at least one size characteristic that is different than a like size characteristic of the second blade. In one example, the at least one size characteristic can be one or more of a blade length, a blade width, and/or a blade height.

In one example, the cutlery set can include a block insert of the knife block that is mounted to the face of the block body. A first sub-slot can pass through the block insert and can be aligned with the first storage slot in the block body. A second sub-slot can pass though the block insert and can be aligned with the second storage slot in the block body. The first and second knife sharpeners can be carried by the block and can be respectively aligned with the first and second sub-slots.

In one example, the cutlery set can include a faceplate of the knife block that covers a block insert. The faceplate can have a first opening that can be aligned with a first sub-slot through the block insert and a second opening that can be aligned with a second sub-slot through the block insert.

In one example, the cutlery set can include a first knife indicia visibly carried on a portion of the first knife that can indicate a characteristic of the first knife and can include a second knife indicia visibly carried on a portion of the second knife that can indicate a characteristic of the second knife A first block indicia can be visibly carried on a portion of the knife block and can be associated with the first storage slot. The first block indicia can match the characteristic of the first knife indicated by the first knife indicia. A second block indicia can be visibly carried on a portion of the knife block and can be associated with the second storage slot. The second block indicia can match the characteristic of the second knife indicated by the second knife indicia.

In one example, a first knife indicium can be carried on an end of the first handle and a second knife indicium is carried on an end of the second handle. A similar or identical indicium can also be carried on a portion of the knife block associated with the respective first and second storage slots.

In one example, a first block indicia can be provided adjacent a first opening on a faceplate of the knife block and a second block indicia can be provided adjacent a second opening on the faceplate. The first and second openings can be associated with the first and second storage slots, respectively.

In one example, the first knife sharpener can contact and sharpen a knife edge of the first blade when the first knife is inserted into and withdrawn from the first slot. The second knife sharpener can contact and sharpen a knife edge of the second blade when the second knife is inserted into and withdrawn from the second slot.

In one example, the cutlery set can have a face angle defined by the face of the block body and can have a bolster angle defined by the first and second handles on the first and second knives, respectively. The bolster angle can be substantially the same as the face angle.

In one example, the first knife sharpener can define a first sharpener angle that can be greater than a first blade edge angle defined by the knife edge of the first knife. The second knife sharpener can define a second sharpener angle that can be greater than a second blade edge angle defined by the knife edge of the second knife. The first and second sharpener angles can be the same or can be different than one another. The first and second blade edge angles can be the same or can be different than one another.

In one example according to the teachings of the present disclosure, a cutlery set has a knife block with a block body and a set of knives including at least a first knife having a first blade and a second knife having a second blade. An array of storage slots in the knife block includes at least a first storage slot and a second storage slot and each extends into the block body from a face of the block body. The first storage slot is specifically sized to receive the first blade and the second storage slot is specifically sized to receive the second blade. A block insert can be mounted to the face of the block body. The block insert has at least a first sub-slot through the block insert aligned with the first storage slot and a second sub-slot through the block insert aligned with the second storage slot. A first knife sharpener is carried by the block insert and is constructed and arranged specifically to sharpen a knife edge on the first blade when the first knife is inserted into or withdrawn from the first slot. A second knife sharpener is carried by the block insert and is constructed and arranged specifically to sharpen the second blade when the second knife is inserted into or withdrawn from the second slot.

In one example, the first blade and the second blade can be different from one another in at least one or more of a blade length, a blade width, and/or a blade height.

In one example, the first and second storage slots can be different from one another in at least one or more of a slot length, a slot width, and/or a slot height.

In one example, the first knife and the second knife can be different from one another in at least one blade characteristic.

In one example, the cutlery set can include a first knife indicia visibly carried on a portion of the first knife and can include a second knife indicia visibly carried on a portion of the second knife. The second knife indicia can be different from the first knife indicia. A first block indicia can be visibly carried on a portion of the knife block, can match the first knife indicia, and can be associated with the first storage slot. A second block indicia can be visibly carried on a portion of the knife block, can match the second knife indicia, and can be associated with the second storage slot.

BRIEF DESCRIPTION OF THE DRAWINGS

Objects, features, and advantages of the present invention will become apparent upon reading the following description in conjunction with the drawing figures, in which:

FIG. 7 shows an exploded bottom perspective view of an insert assembly of the knife block of FIG. 6.

FIG. 8 shows a close-up and partial cut-away view taken from FIG. 5 of a sharpener element of the insert assembly in FIG. 7.

FIG. 9 shows a top perspective view of part of a sharpener element of FIGS. 7 and 8.

FIG. 10B shows a plan view into one of the knife storage slots, which has a sharpener element.

FIG. 10C shows a simplified view of a sharpener element comparing a sharpener angle of the sharpener element and a blade edge angle of a knife blade.

FIG. 11 shows a left side view of the knife block of the cutlery set of FIG. 1 with a knife of the cutlery set partially withdrawn from the knife block.

DETAILED DESCRIPTION OF THE DISCLOSURE

The present disclosure is directed to examples of a knife block and of a cutlery set that are configured and arranged to solve or improve upon one or more of the above-noted and/or other problems and disadvantages with prior known knives, sharpening techniques, knife blocks, and cutlery sets. In one example, a knife block is disclosed that has a block body, knife storage slots in the body, and first and second knife sharpeners aligned with first and second slots of the storage lots, respectively. In one example, the first and second knife sharpeners are each specifically configured to contact a blade of a different knife stored in the corresponding first and second slots. In one example, a cutlery set is disclosed that has a plurality of knives and a knife block with a block body, knife storage slots in the body, and at least one sharpener aligned with a first slot of the storage slots. In one example, the first slot is configured and arranged to store a specific knife of the plurality of knives. The sharpener can be configured to contact and sharpen a cutting edge of the specific knife when the knife is inserted into the first slot, removed from the first slot, or both. These and other objects, features, and advantages of the disclosed cutlery sets and knife blocks will become apparent to those having ordinary skill in the art upon reading this disclosure.

The term "substantially" may be used herein with reference to dimensions, sizes, angles, and the like. The term is intended to mean that two characteristics, when compared to another as being the same as one another may not in fact be exactly the same as one another. The differences may be permissible within normal manufacturing tolerances or may be reasonable minor differences understood among those having ordinary skill in the art.

Figure 1:
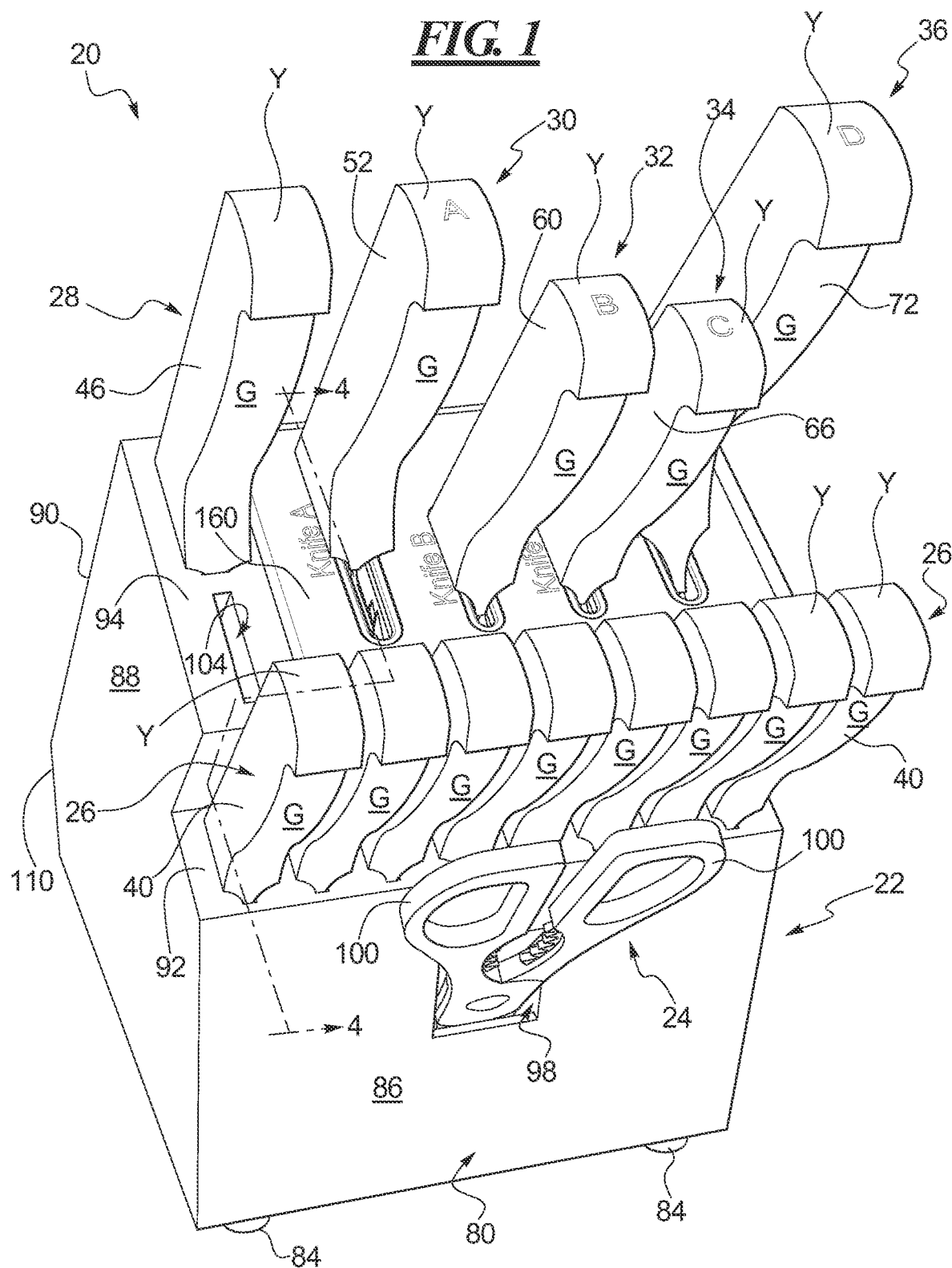
FIG. 1 shows a perspective front, top, and right side view of one example of a cutlery set constructed in accordance with the teachings of the present disclosure.
Figure 2:
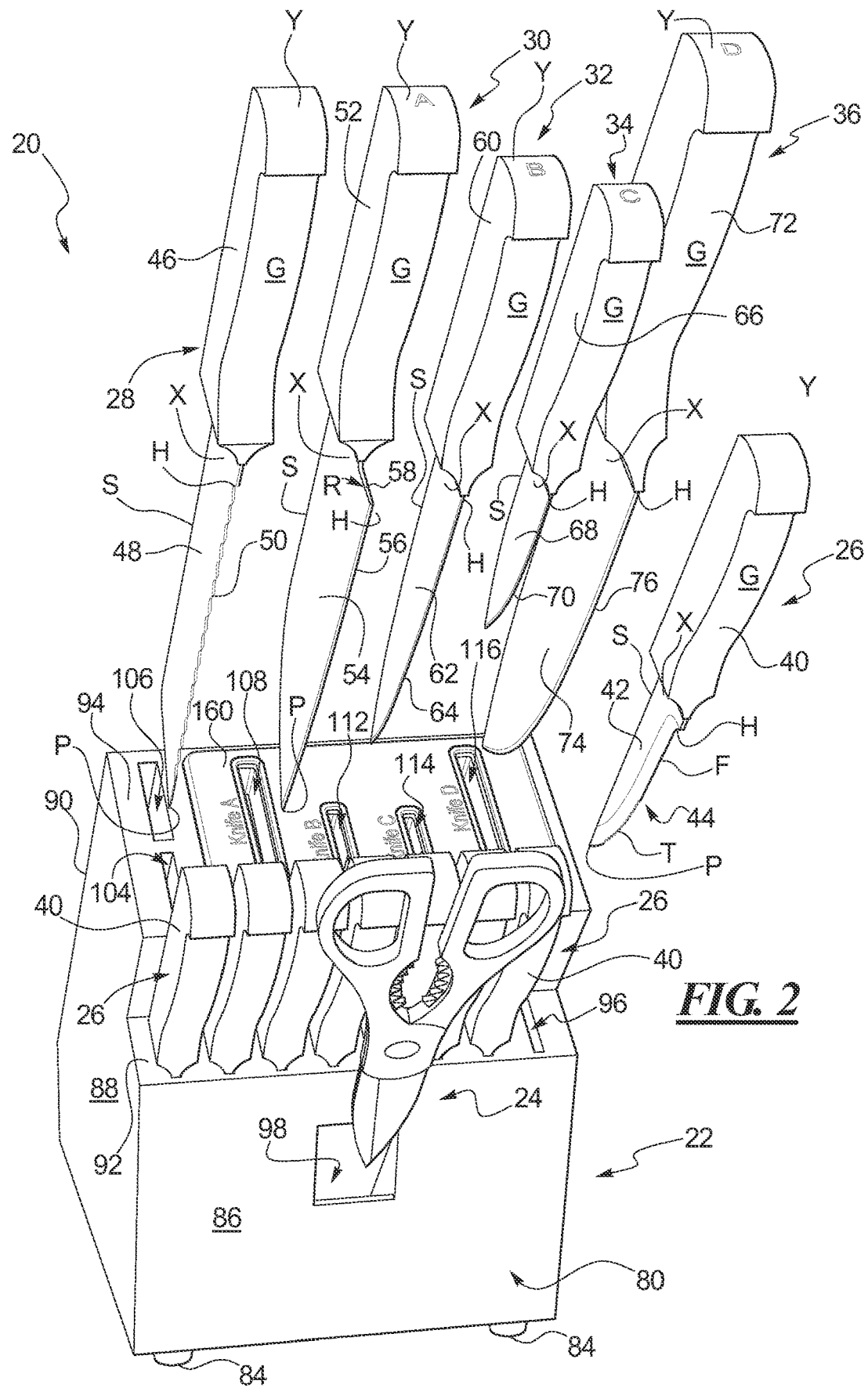
FIG. 2 shows a partial exploded view of the cutlery set of FIG. 1.
Figure 3:
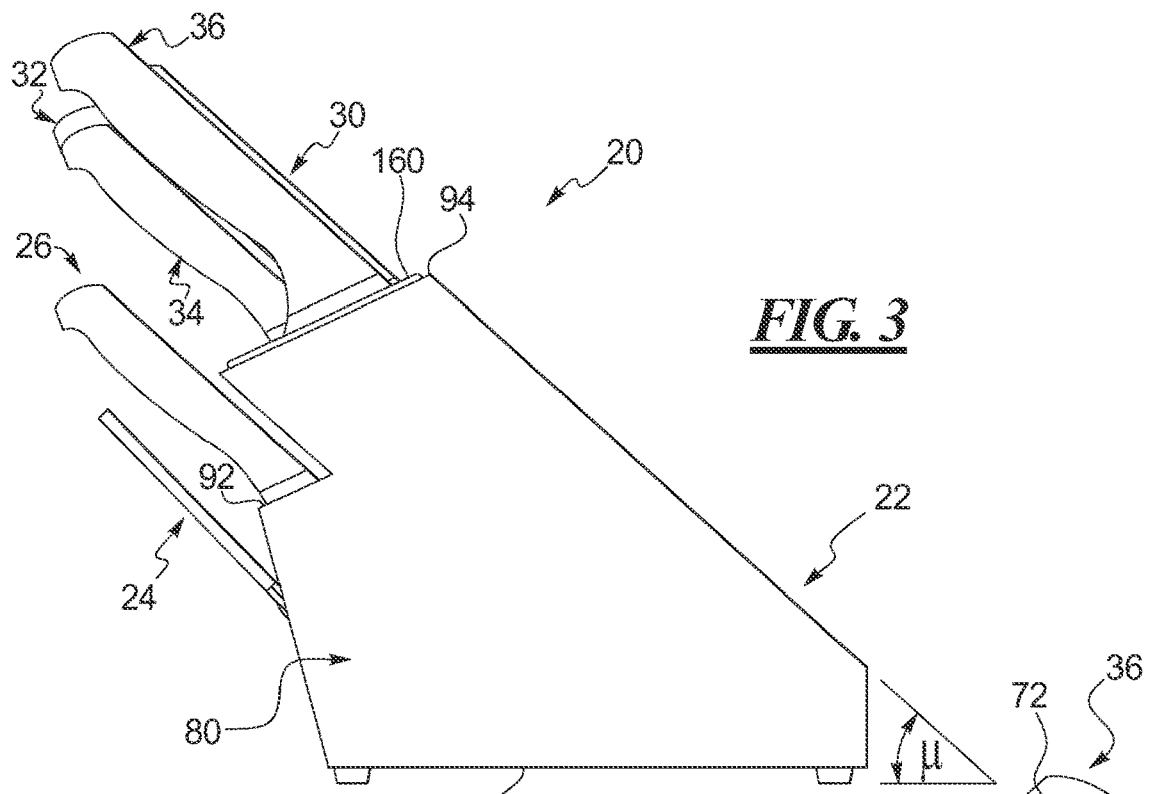
FIG. 3 shows a left side view of the cutlery set of FIG. 1.
Figure 4:
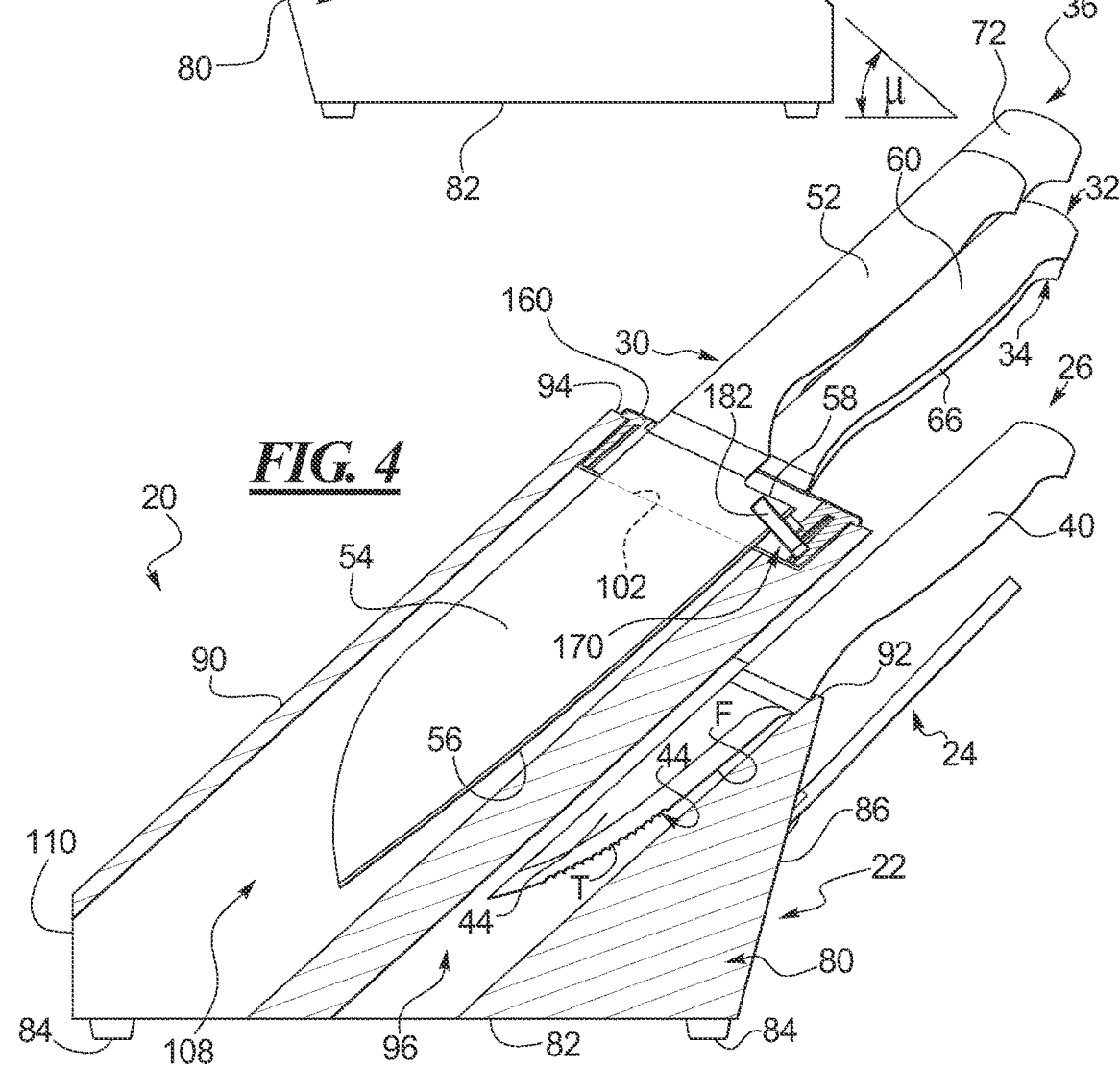
FIG. 4 shows a right side cross-section view taken along line 4-4 of the cutlery set of FIG. 1.
Figure 5:
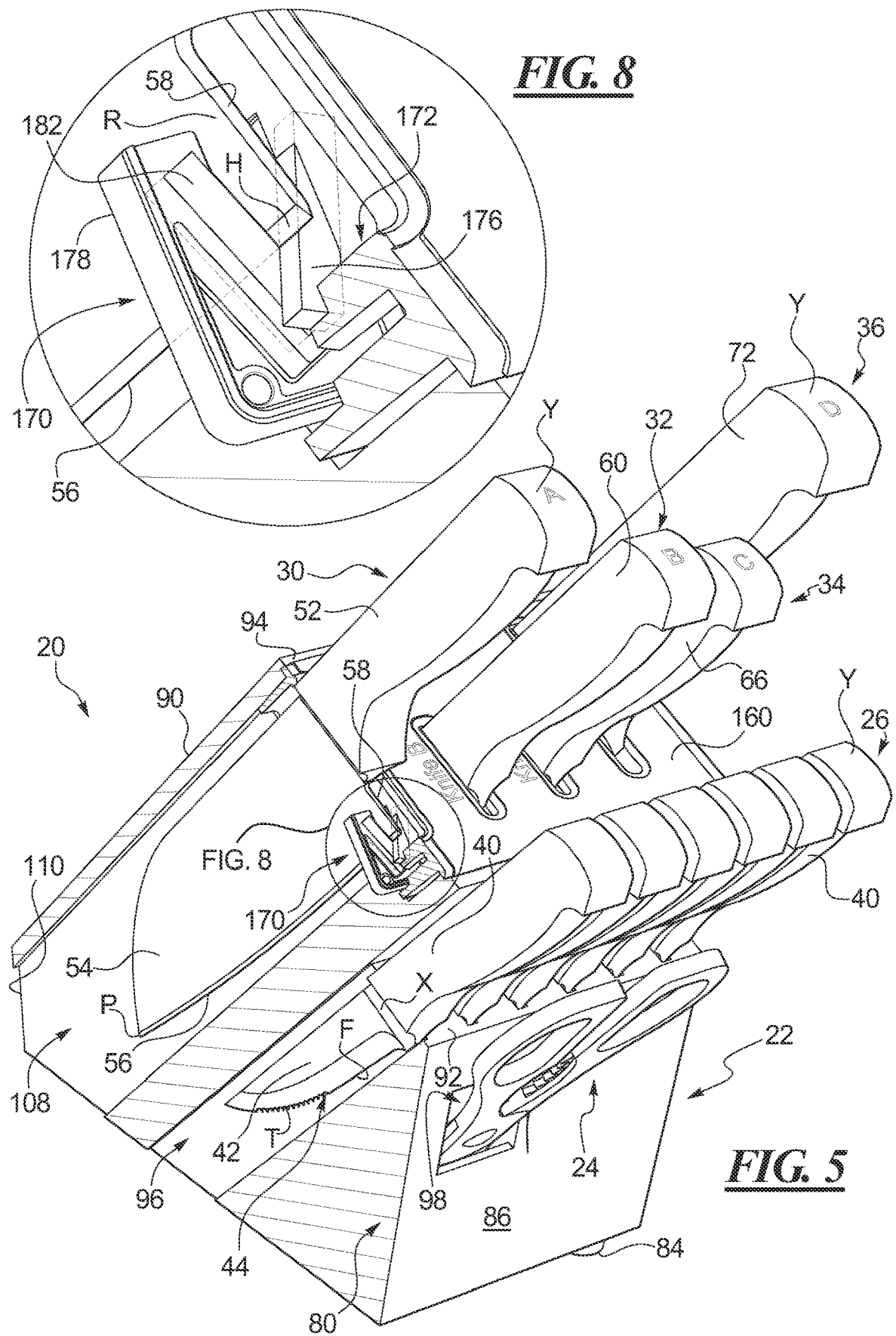
FIG. 5 shows a perspective view of the cross-section of the cutlery set of FIG. 4.

Turning now to the drawings, FIGS. 1-5 show one example of a cutlery set 20 constructed in accordance with the teachings of the present disclosure. FIG. 2 shows a partially exploded view of the cutlery set 20 and FIG. 3 shows a side view. FIGS. 4 and 5 show different views of the cutlery set in partial cross-section. The cutlery set 20 generally has a knife block 22 and a plurality of cutting implements. In this example, the cutting implements of the cutlery set 20 include kitchen shears or kitchen scissors 24, eight steak knives 26, a bread knife 28, a Santoku knife 30, a utility knife 32, a paring knife 34, and a chef's knife 36. As will be evident to those having ordinary skill in the art upon reading this disclosure, the size, shape, and fabrication materials and methods of the knife block 22 can vary within the spirit and scope of the present disclosure. Likewise, the number and types of cutting implements and the details of each specific cutting implement can also vary from the examples disclosed and described herein. The cutlery set 20 described herein is just one of many possible examples of such a set.

The kitchen scissors 24, if provided as part of the cutlery set 20, can be of a conventional or typical construction and are not further described herein. Each of the knives 26-36 can also have a conventional construction, but the details of each knife can vary. A number of the basic features of most knives are referred to herein using reference letters and these reference letters are commonly used for each of the knives 26-36. A few features of each knife, and particular those aspects that are of interest herein and/or those aspects that are substantially different in comparison to the other knives, are identified herein using reference numbers unique to each knife.

In the disclosed example, the cutlery set 20 includes eight steak knives 26, with only one shown as withdrawn from the knife block 22 in FIG. 2. The cutlery set 20 could include no steak knives or could include more or less that the eight steak knives 26 that are shown herein. Each steak knife 26 has a handle 40 and a blade 42 extending from one end of the handle. The blade 42 terminates at a point P at the free end of the blade. The blade 42 has a cutting edge 44 that extends lengthwise from the point P to a heel H of the blade, which is adjacent or near the handle 40. The cutting edge 44 is the honed, thin, sharp surface or edge of the blade 42. The blade 42 also has a spine S with is the edge of the blade opposite the cutting edge 44. The spine S is typically thicker than the cutting edge 44 and provides weight and strength or rigidity to the blade. The blade 42 has a bolster X that is opposite the blade point P, is adjacent the heel H, and is a thicker part of the blade that joins the blade to the handle 40. A return R is typically positioned between the bolster X and the heel H. The handle 40 has a grip section G that is formed for a user to grasp and manipulate the knife 26. The handle 40 terminates at a butt Y or butt end that is the free end of the handle and has a handle guard Z in the form of a downward protruding portion or lip near the butt. The handle guard Z can aid in preventing a user's hand from slipping while using the knife 26.

Though not shown herein, the handle on many knives is formed having two separate halves or scales that are attached to a tang of the blade that extends into the handle. Often rivets or pins are used to secure the scales to the tang of the blade. The particular handle and blade attachment construction is not of particular relevance to the disclosure and is thus not mentioned any further here. As will be evident to those having ordinary skill in the art, the shape, construction, and configuration of the handle 40 and the tang portion of the knife blade 42 can vary as well.

Features and details of the cutting edge can also vary for a given knife. A cutting edge of a knife typically has a grind (what the sharp edge looks like in cross-section) and a profile (what the cutting edge looks like from the side). The grind is the macro-formed V-like cross-section shape of the blade that will ultimately form the cutting edge when the blade is manufactured. The grind of the blade can be a hollow grind, a flat grind, a sabre grind, a chisel grind, a beveled grind (double, compound, etc.), a convex grind, or the like. The grind is not of particular relevance to the disclosure, other than that it might dictate the particular type of or details for a sharpener element utilized for a specific knife, as discussed below. The sides of the blade between the cutting edge and the spine S can be smooth and flat (except for the grind contour) or can include indentations, dimples, holes, or the like. The profile of the blade relates to whether the cutting edge is straight or serrated and whether the cutting edge is linear or curved. A cutting edge can include more than one type of profile over its length.

In this example, the cutting edge 44 of the steak knife 26 has a serrated portion T (with teeth) nearer the point P and a straight portion F nearer the heel H. The cutting edge 44 is also curved from the heel H to the point P. In general, the steak knife 26 has a blade length from the point P to the bolster X, a blade width between the blade sides, and a blade height between the spine S and the cutting edge 44. The height varies from the point P to the heel H because the cutting edge has a curved profile. The maximum height of the blade 42 is at the return R, as the heel H of the cutting edge curves downward away from the spine S adjacent the bolster X.

A knife blade can be fabricated from stainless steel, carbon steel, high carbon stainless steel, titanium, ceramic, plastic, or other suitable materials, alloys, composites, laminates, and the like. The blades can thus be forged, molded, stamped, or the like. A knife handle can be formed of virtually any suitable material as well, such as wood, steel, aluminum, plastic, composites. The handles and blades of the disclosed knives and cutlery set are not intended to be limited in any way to a particular material or manufacturing process.

The bread knife 28 has a handle 46 that is similar in size and shape to the handle 40 of the steak knife 26. However, the handle 46 can be different, if desired. The bread knife 28 also has a long blade 48 with a serrated cutting edge 50 from the point P to the heel H. The cutting edge 50 is substantially linear as well from the heel H to the point P and the blade has a consistent height over much of its length. The spine S is curved toward the cutting edge 50 nearer the point P.

The Santoku knife 30 has a handle 52 and a long and large blade 54 with a straight cutting edge 56. The cutting edge 54 is slightly curved (see FIG. 4), more noticeably nearer the point P than at the heel H. The handle 52 is also similar in size and shape to the handle 40 of the steak knife 26, but again the handle can be different, if desired. The spine S also curves sharply toward the cutting edge 56 nearer the point P. In this example, the blade height between the cutting edge 56 and the spine S near the bolster X is much greater than the height of the handle 52. This creates a finger guard 58 on the back side of the blade between the return R and the bolster X. The finger guard can keep a chef's hand from slipping onto the blade during use. Such a finger guard can be provided on the other knives of the cutlery set 20, if desired.

The utility knife 32 has a handle 60 that is similar in shape to the handles 40, 46, and 52, but not in size. The handle 60 is smaller in size. The utility knife 32 has a blade 62 with a straight cutting edge 64 and a gradually tapering height between the spine S and cutting edge 64 from the bolster X to the point P.

The paring knife 34 also has a handle 66 that is similar in shape to the other handles, though the handle is smaller in size than even the utility knife handle 60. The paring knife 34 has a short blade 68 with a straight but curved cutting edge 70. The height of the blade 68 also tapers between the spine S and cutting edge 70 from the heel H to the point P. The width of the blade 68 can be less than or thinner than the width of the other blades of the knives 26-32 and 36 of the cutlery set 20.

The chef's knife 36 has a handle 72 that is similar in shape but larger in size than the other handles. The chef's knife 36 also has a long and large blade 74 with a straight cutting edge 76 that is curved, more so nearer the point P. The spine S is somewhat linear and the cutting edge instead curves upward toward the spine nearer the point P. The blade 76 can be wider than the other blades of the knives 26-34 of the cutlery set 20.

Based on the foregoing, the cutlery set 20 can include a plurality of knives. One or more of the knives of the cutlery set 20 can have a different blade characteristic in comparison to the other of the knives such as a blade length, a blade width, a blade height, a cutting edge profile, a cutting edge grind, or the like. The width, height, and shape of the bolster on the knives can vary. The length, width, grip shape, finger guard shape, or the like of the handles can also vary. In accordance with the teachings of the present disclosure, the cutlery set 20 can include at least one knife with a straight cutting edge than can be sharpened without resorting to professional help or without destroying the cutting edge, as will become evident below.

With reference to FIGS. 3-5, the knife block 22 of the cutlery set 20 generally has a block body 80 that has a polyhedron shape. The block body 80 has a bottom 82 that is configured to rest on a surface, such as a countertop. The bottom 82 can include anti-skid pads 84 or some other type of integral or attached legs or feet that elevate the block body above the surface. Alternatively, the bottom 82 can be configured to rest directly on the surface. The block body 80 also generally has a front 86, opposed sides 88, and a back 90 that in this example form the polyhedron body shape. The block body 80 also has a stepped top or knife receiving side with a lower step or knife receiving surface 92 above the front 86 and an upper step or knife receiving surface 94 above the lower knife receiving surface. The upper and lower knife receiving surfaces 92, 94 are vertically separated by a wall segment 95.

The polyhedron shape of the block body 80 in this example has a very angular look with each of the bottom 82, front 86, sides 88, and back 90 having a polygonal shape. However, as will be evident to those having ordinary skill in the art upon reading this disclosure, the shape and configuration of the knife block 22, and particularly the block body 80, can vary considerably within the spirit and scope of the present invention. The body can be rounded, circular, semi-spherical, square, rectangular, cuboid, triangular, pyramidal, or the like. The body can have an odd, irregular shape and can incorporate any combination of rounded, curved, flat, or angular surface contour. The body need not have a discernible front, back, or sides and need not have a discernible top side and the one or more knife receiving surface can be in a top, a front, a back, a side, or any other suitable surface of the body.

The disclosed knife block 22 has a plurality of storage slots formed into the block body 80, and particularly into one of the lower or upper knife receiving surfaces 92 or 94, for receiving one of the cutlery implements described above. In this example, the plurality of storage slots includes an array of steak knife storage slots 96 formed into the lower knife receiving surface 92 of the block body 80. Each storage slot 96 of the array is configured to receive and store one of the steak knives 26. Each storage slot 96 is thus sized having a length into the block body 80 at least sufficient to receive the length of a blade 42 of one of the steak knives 26. Each storage slot 96 is also sized having a width at least sufficient to receive the width of the blade 42 of the steak knife 26. Each slot 96 is also sized having a height at least sufficient to receive the maximum height of the blade 42 of the steak knife 26. In this example, the height of each slot 96 is excessive in the direction of the spine S of the blade 42 and the length of each slot is also excessive beyond the point P at the end of the blade 42, as shown in FIGS. 4 and 5. The width of each slot 96 can also be slightly wider than the blade 42 so that a narrow portion of the handle 40 attached to the bolster X can seat in the slot as shown in FIGS. 1, 4, and 5. In this way, the slots 96 can position the steak knives 26 with the handles 40 borne against the lower surface 92 surrounding the slot. The opening into each slot 96 can also be chamfered, if desired, in order to guide the handle portion of the handle 40 into the slot when a steak knife 26 is inserted into the knife block 22.

The plurality of storage slots can also include a scissor slot 98 formed into the block body 80 for storing the scissors 24. In this example, the scissor slot 98 is formed in the front 86 of the block body 80. The scissors 24 can be inserted blades first into the scissor slot 98 to store the scissors 24 in the knife block 22. The scissor slot 98 can also be sized having a length at least sufficient to receive the blades of the scissors and can have a width and height at least sufficient to fit or accommodate the blades of the scissors, leaving the handle ends 100 of the scissors 24 exposed.

Figure 6:
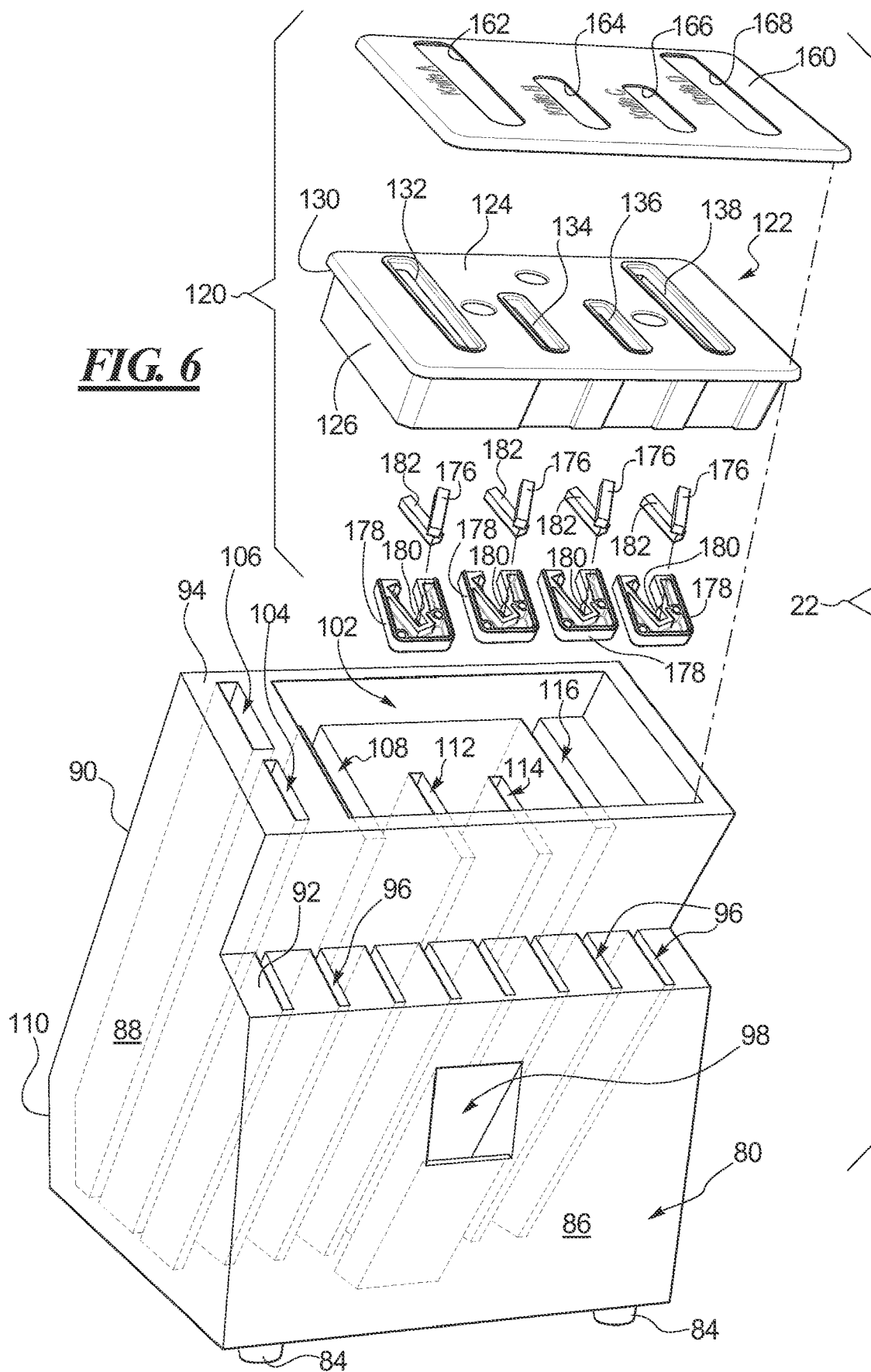
FIG. 6 shows an exploded top, front, and left side perspective view of the knife block of the cutlery set of FIG. 1.

With reference to FIGS. 2, 4, and 5, the plurality of storage slots in the block body 22 can also have a number of storage slots that are specifically sized to receive a particular one of the other cutlery implements of the set 20. In this example, each of the additional storage slots (described below), the steak knife slots 96, and the scissor slot 98 can optionally have an excessive length in comparison to the particular cutlery implement to be stored therein. In one example, some or all of the storage slots in the block body 80 can extend completely through the block body. In this example, the steak knife slots 96 open both into the lower step 92 and into the bottom 82 of the block body 80. With reference to FIG. 6, the scissor slot 98 can also open both into the front 86 and into the bottom 82 of the block body 80. In other examples, any one or more of the storage slots disclosed herein can instead be a blind slot that terminates within the block body 80.

With reference to FIGS. 4-6, the block body 80 has a recess 102 formed into the upper stepped surface or knife receiving surface 94. The purpose of the recess 102 is discussed below. In this example, the plurality of storage slots can include one or more, and in this case one spare storage slot 104. The spare storage slot 104 is open into the upper knife receiving surface 94 adjacent to but not within the recess 102. One or more such spare storage slots 104 can be provided so as to allow a user to add knives or other cutlery implements to the cutlery set 20, if desired. The plurality of storage slots can further include a bread knife slot 106 that is configured having a length, width, and height at least sufficient to receive and store the blade 48 of the bread knife 28 therein. For reasons discussed below, the bread knife slot 106 is also open into the upper knife receiving surface 94 adjacent to but not within the recess 102.

The plurality of storage slots can further include one or more slots that each open into the recess 102 within the upper knife receiving surface 94. One of these slots is a Santoku knife slot 108 (see FIGS. 2 and 4-6) for storing the Santoku knife 30. The Santoku knife slot 108 in this example extends completely through the block body 80 and opens in part into the bottom 82 and in part into a vertical segment 110 of the back 90 of the body. The Santoku knife slot 108 can have a length that is at least sufficient to receive the length of the blade 54 of the Santoku knife 30, a width at least sufficient to accommodate the width of the Santoku knife blade, and a height at least sufficient to accommodate the maximum height of the Santoku knife blade, as shown in FIGS. 4 and 5. The size of the Santoku knife slot 108 can be larger than the size of the bread knife slot 106 and the steak knife slots 96 because the Santoku knife has a longer, wider, and taller blade 54.

The plurality of storage slots can also include a utility knife slot 112 for storing the utility knife 32 and a paring knife slot 114 for storing the paring knife 34. Each of the slots 112, 114 is also open into the recess 102 within the upper knife receiving surface 94. Each of these storage slots 112, 114 can be sized to specifically accommodate the blade size of the utility knife blade 62 and the paring knife blade 68, respectively, which have different size characteristics. Each can have a length that is at least sufficient to receive the corresponding blade. Again, the utility knife slot 112 and paring knife slot 114 can each extend completely through the block body 80, as in this example, or can be blind slots that terminate within the body. Each slot 112, 114 can also have a width and height to accommodate the specific width and height of the respective utility and paring knife blades 62, 68, which can also be of different size. The plurality of storage slots can also include a chef's knife slot 16 that opens into the recess 102 within the upper knife receiving surface 94. Again, the chef's knife slot 116 can extend completely through the block body 80 or can be a blind slot that terminates within the body. The length, width, and height of the chef's knife slot 116 can again be sized to accommodate the specific length, width, and height of the chef's knife blade 74, which is much larger than the paring knife blade 68, for example. Thus, the chef's knife slot 116 can be much larger in size (i.e., length, width, and/or height) than the paring knife slot 114 and the utility knife slot 112.

In view of the foregoing, it should be evident to one having ordinary skill in the art that the number, sizing, and arrangement of the plurality of storage slots in the knife block 22 can be varied form the example shown. The arrangement of the various storage slots relative to one another can be altered. The steak knife slots and/or the bread knife slot can be eliminated. The number of steak knife slots can be reduced or increased, as can the number and/or type of the remaining cutlery implement slots.

As shown in FIGS. 6 and 7, the knife block 22 as disclosed herein has an insert assembly 120 that is sized to fit the recess 102 and that is mounted substantially within the recess. The recess 102 in this example has a rectangular shape and has a depth into the upper knife receiving surface 94. The insert assembly 120 has a block insert 122 that has a rectangular shape with an upper face plate 124, a surrounding side wall 126, and a somewhat hollow underside 128 within the side wall and under the face plate. The side wall 126 is sized to fit in the recess 102. The upper face 124 has a lip 130 that protrudes radially outward relative to the side wall 126 and rests on the upper knife receiving surface 94 around the recess 102 (see FIG. 4). The underside 128 of the block insert 122 is generally hollow in this example but has a plurality of ribs that extend across the block insert. The plurality of ribs can add rigidity and strength to the structure, but in this example are also provided for another purpose.

The face plate 124 has a plurality of openings through the plate that are positioned to coincide with the storage slots within the recess 102. Specifically, the face plate 124 has a Santoku knife opening 132 that is aligned with the Santoku knife slot 108 with the block insert 122 installed in the recess 102. Likewise, the face plate 124 has a utility knife opening 134, a paring knife opening 136, and a chefs knife opening 138 that are respectively aligned with the corresponding utility knife slot 112, the paring knife slot 114, and the chefs knife slot 116 within the recess 102. The plurality of ribs includes a first spaced apart rib pair 140 that creates a Santoku knife sub-slot 142 on the underside 128 of and through the block insert 122. The Santoku knife sub-slot 142 is aligned with both the Santoku knife opening 132 in the face plate 124 and the Santoku knife slot 108 in the block body 80. A second rib pair 144 creates a utility knife sub-sot 146 through the block insert 122 that is aligned with both the utility knife opening 134 in the face plate 124 and the utility knife slot 112 in the block body 80. A third rib pair 148 creates a paring knife sub-slot 150 through the block insert 122 that is aligned with both the paring knife opening 136 in the face plate 124 and the paring knife slot 114 in the block body 80. A fourth rib pair 152 creates a chef's knife sub-slot 154 through the block insert 122 that is aligned with both the chef's knife opening 138 in the face plate 124 and the chef's knife slot 116 in the block body 80.

A cover plate 160 can be attached, adhered, or otherwise mounted to the face plate 124 of the block insert, if desired. The cover plate includes a plurality of holes 162, 164, 166, and 168 that each overly and align with the Santoku knife opening 132, the utility knife opening 134, the paring knife opening 136, and the chef's knife opening 138, respectively, when the cover plate is mounted on the face plate 124 of the block insert 122. The cover plate 160 can be a decorative item to improve the ornamental appearance of the cutlery set 20. The cover plate 160 can be a laminate structure with a decorative or ornamental surface or can be a homogeneous structure. The cover plate 160, or at least the exposed surface layer, can be formed of wood, plastic, stainless steel, aluminum, titanium, platinum, or the like and/or can be finished to achieve a desired appearance. Also, the block insert 122 can be a molded plastic, one piece component or can be fabricated from wood, steel, aluminum, or the like. The face plate 124 can define the exposed surface over the recess 102, eliminating the cover plate 160 altogether, if desired.

As used herein below, the term "storage slot" may refer to the combined, knife blade receiving, aligned slots in the block body 80, sub-slots in the block insert 122, openings in the face plate 124, and holes in the cover plate 160. Thus, when referring to one of the cutlery implements being inserted into or withdrawn from its respective storage slot, the implement may be passing into, though, and/or out of the corresponding slot, sub-slot, opening, and hole.

In the disclosed example, the cutlery set 20 employs a plurality of sharpening elements 170 that coincide with respective storage slots for the Santoku knife 30, utility knife 32, paring knife 34, and chef's knife 36. Each sharpening element is carried on or is a part of the insert assembly 120. See the sharpening element 170 for the Santoku knife 30 in FIG. 8 and portions of the sharpening elements 170 in FIGS. 6, 7, and 9. The sharpening elements are shown having essentially the same construction so only one of the sharpening elements is described herein. The description applies equally to the other of the sharpening elements. However, the sharpening elements can each be configured differently (from one another and/or from the disclosed example). For example, the sharpening elements can each be specifically configured to provide the desired sharpening characteristics to the corresponding knife blade cutting edge and to accommodate the surface angles and/or the grind shape for the corresponding knife cutting edge.

With reference to FIGS. 6-9, each sharpening element 170 has a stone holder 172 associated with each of the sub-slots 142, 146, 150, and 154 on the underside 128 of the block insert. The stone holder 172 can be integrally molded as a part of the block insert 122, as in this example, or can be a separate element attached to the underside. The stone holder 172 has a recess or hollow shape upward toward the face plate 124. With regard to the Santoku knife storage slot, a lower end of the opening 132 and sub-slot 142 aligns with a first notch 173 created by the stone holder 172. The stone holder 172 defines a first stone pocket 174 oriented at an angle relative to the opening and sub-slot. A first sharpening stone 176 is seated in the first stone pocket 174. In this example, both the first stone pocket 174 and the first sharpening stone 176 have a rectangular cuboid shape. Each sharpening element 170 also has a cap 178 that is similarly shaped in comparison to the stone holder 172. In other words, the cap 178 has a recessed or hollow interior and defines a second stone pocket 180 therein. A second sharpening stone 182 is seated in a second stone pocket of the cap 18 and each essentially identical to the first stone pocket 174 and sharpening stone 176 in this example. However, the second stone pocket 180 is also oriented at an angle relative to the opening 132 and sub-slot 142, but in the opposite direction relative to the first stone pocket 174. A second notch 184 in the cap 178 coincides with the first notch of the stone holder 172 when the sharpening element 170 is assembled.

Figure 10A:
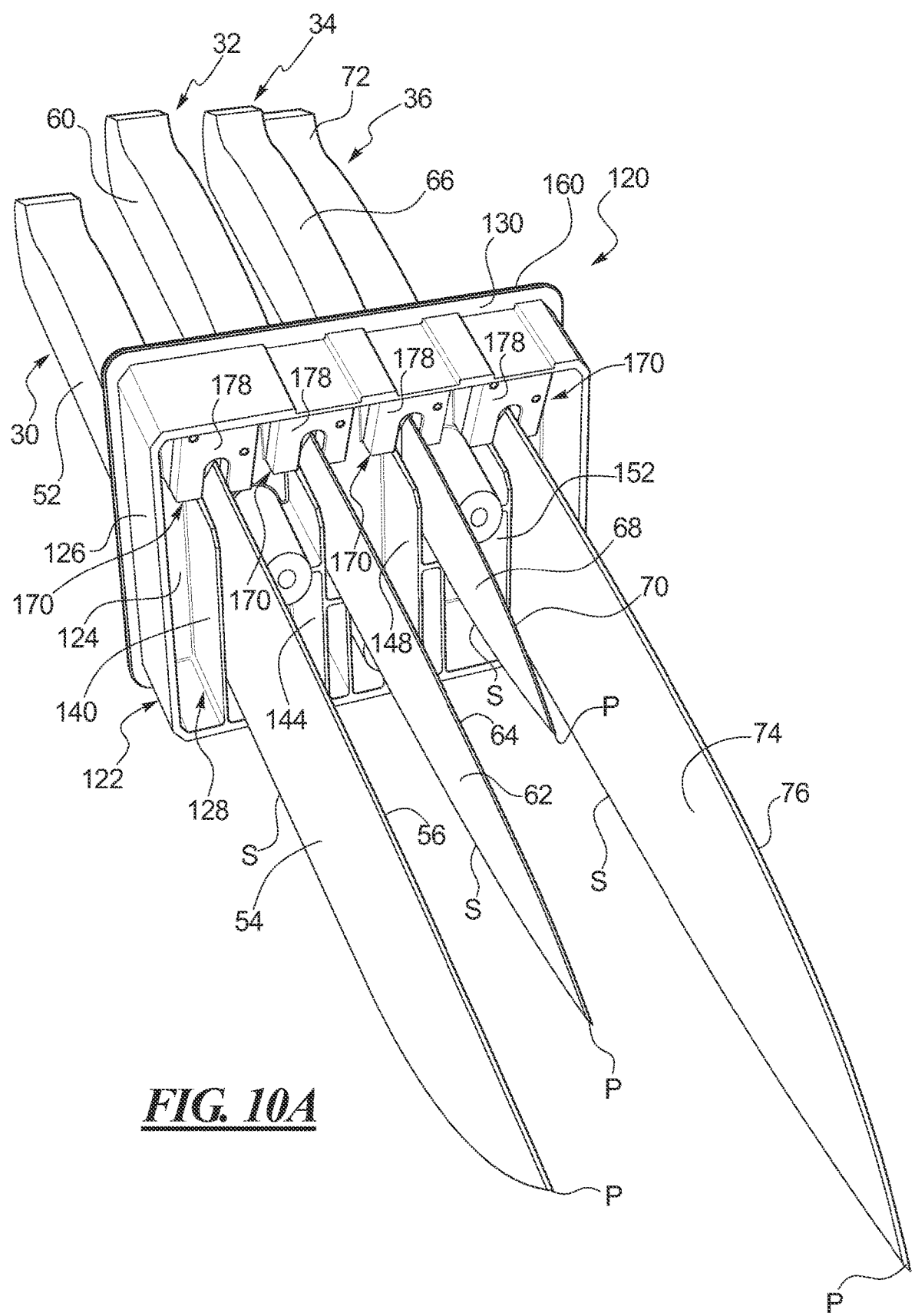
FIG. 10A shows a bottom and rear perspective view of the insert assembly of FIG. 7 in an assembled condition and with the knives of the cutlery set of FIG. 1 inserted.

The cap 178 covers the stone holder 172 as shown in FIGS. 8 and 10A and a cavity is formed between them defined by the recesses of the mating parts. The first and second sharpening stones 176 and 182 are captured in the cavity within their respective stone pockets 174 and 180. The first stone pocket 174 and second stone pocket 180 are arranged to create a V-shape and thus the first and second sharpening stones 176 and 182 are arranged in the V-shape, as shown in FIGS. 6-8 and 10B. Also, the valley or wedge of the V-shape created by the sharpening stones 176, 182 is exposed within the first and second notches 173, 184. Thus, when looking into the Santoku knife storage slot (see FIG. 10B), one can see the V-shape or wedge of the sharpening stones 176, 182.

The caps 178 can also be made of plastic or can be made of other suitable materials, if desired. If both the stone holders 172 and the caps 178 are formed of plastic, the two parts can be heat welded together. For example, one of the two parts (stone holder 172 or cap 178) can be provided with one or more pins 184 and the other of the two parts can be provided with a like number of holes 186. The pins can be received within the holes to align the two parts when assembled and can then be heat welded to secure the two parts together. In other examples, fasteners could be used to assemble the holders and caps, which might allow a user to disassemble the sharpening elements to replace the sharpening stones 176, 182, if and as needed.

Though one particular sharpening element configuration is disclosed herein, other configurations are certainly within the spirit and scope of the present invention. The invention is not necessarily limited to only the one example given. The sharpening elements can be complete and separate devices attached to the slots in the knife block 22, attached to the block insert 122, or the like. The sharpening stones can be changed in type and shape, and can be installed, assembled, and/or held in place in different ways. Other sharpening materials can be used instead of stones. The stones can be natural or synthetic and the grit of the stones can vary as desired.

Likewise, the included angle, i.e., the V-shape or sharpener angle created by the angled sharpening stones or sharpening elements can be varied. One's attention is drawn to FIG. 10C as a reference for the following description. In one example, each of the knives (such as the utility knife 32 and its blade 64 shown in FIG. 10C) can have the same blade angle $\theta$ and each of the sharpening elements 170 (the stones 178, 182 in this example) can define a V-shape with the same angle $\psi$. For reasons discussed immediately below, the sharpener angle $\psi$ can be greater than the blade edge angle $\theta$. In another example, two or more, or even each, of the blades of the cutlery set can have a different blade angle $\theta$ in comparison to other blades of the set. In such an example, the V-shape of the sharpener angle $\psi$ of each sharpening element can be different to accommodate the blade edge angle $\theta$ for a specific knife of the set. Alternatively, each of the sharpener elements can have the same sharpener angle $\psi$, which can be larger than the largest blade angle of the blades of the cutlery set.

In each instance, the V-shape of the sharpener angle $\psi$ can be larger than the blade edge angle $\theta$ in a given knife slot as depicted in FIG. 10C. With such an arrangement, the tip of the knife edge on the blade will be sharpened each and every time from the first insertion and withdrawal of the knife from the slot. This would occur, regardless as to whether the knife edge were run over the sharpening element exactly vertical or offset slightly from vertical, as shown in FIG. 10C. If this angular arrangement is not used, it may take considerable time before the knife edge of the blade is properly sharpened during insertion and removal. In one illustrative example, the blade angle $\theta$ can be about 40 degrees and the sharpener angle $\psi$ can be about 45 degrees. In another illustrative example, the blade angle can vary between 32-40 degrees among the cutlery set knives and each sharpener angle can again be about 45 degrees. Alternatively, the sharpener angle $\psi$ for each sharpening element can be specific to and a few degrees greater than the particular blade angle $\theta$ of the knife to be stored in a given storage slot.

With reference to FIGS. 10A-10C and 11, when a user inserts or withdraws one of the knives associated with one of the sharpening elements 170 from the specific storage slot for that particular knife, the cutting edge can be drawn across the stones within the storage slot. This can sharpen the cutting edge of the blade each time the knife is inserted or withdrawn. The width of the blade and the width of the slot can be such that the blade is held precisely perpendicular between the two sharpening stones so as to properly and consistently sharpen the blade.

Also with reference to FIGS. 3 and 11, a bolster angle β is created between the lengthwise axis of the knife, such as the Santoku knife 30, and the knife bolster X. Likewise, a face angle α is created between the knife receiving face of the block body 22, the upper knife receiving surface 94 in this example, and the lengthwise axis of the knife storage slots (which is the same as the angle of the back 88 of the knife block 22 in this example). Further, in one example, the knife lengthwise axis angle and/or the slot axis angle µ relative to a horizontal reference can be between about 40 degrees and about 55 degrees for each of the knife storage slots. In one more specific example, the angle µ can be between about 42 degrees and about 48 degrees, and in one particular example can be about 45 degrees relative to a horizontal reference. In another particular example, the angle µ can be about 52.5 degrees. The angle µ, however, need not be the same for each of the different knife storage slots. The angle µ can be different among one or more of the storage slots that pass through the insert assembly 120, i.e. among the slots that have a sharpening element. Or, the storage slots can all have the same angle. The angle µ for the knives that do not have a storage slot sharpening element can also be different than that of the knives with sharpener elements, or the angles can be the same.

In one example, the bolster angle β and the face angle α can be the same or substantially the same (i.e., the same within manufacturing tolerances or the same within a degree or two). During use, when a user withdraws or inserts a knife, such as the Santoku knife 30 relative to its respective storage slot, this angular relationship can create two benefits or advantages. First, in general, the exact value of the angles α and β may not be specifically important. However, having these angles equal to one another may allow the knife to sit securely in the block. This can prevent wobble and allow for as much of the blade as possible to be sharpened. If these angles do not match, then the knife blade may not be insertable all the way into the block. This can prevent a portion of the blade being sharpened. Also, with the angles being equal and, in one example, about 113 degrees (23 degrees from a horizontal reference) as shown in FIG. 11, the specific angle can allow the center of gravity of the knives to rest to the right in the drawing (interior to the knife block 22), i.e., beyond the fulcrum formed by the sharpener elements. This can allow 1) better contact between cutting edge and sharpening stones and inhibited or no tipping of the knives with respect to the knife block and 2) the ability to reduce the overall block angle relative to the horizontal reference as much as possible to facilitate engagement between the cutting edge and the sharpener element. The bolster angle β and face angle α can vary, depending on the design of the knives and their balance or center of gravity.

With reference to FIGS. 6 and 7, the disclosed cutlery set 20 can include at least one sharpening element 170 that is associated with one slot of the plurality of storage slots. This one slot can be configured to accept a specific blade size and shape of a particular knife to be stored within the slot. The cutting edge of the blade can then contact the sharpening stones 176, 182 when the knife is inserted into and withdrawn from the one slot. In one example, the cutlery set 20 can include a first slot and a second slot of the plurality of storage slots and each can include a separate sharpening element 170 associated with the respective slot. Both the first and second slots can be configured differently and to accept a specific blade size and shape. In the disclosed example, the cutlery set 20 includes four different knives 30, 32, 34, and 36 that each have a sharpening element 170 associated with the respective storage slot.

It is known that cutting edges with serrated blade profiles are not well suited for conventional consumer-friendly sharpeners or consumer-capable sharpening techniques. Thus, one or more of the plurality of storage slots may not include a dedicated sharpening element 170 associated with that particular slot. In the disclosed example, the bread knife 28 has a serrated cutting edge 50 on its blade 48 and the steak knives 26 each have a partly serrated cutting edge 44 on their blades 42. Thus, the steak knife slots 96 and the bread knife slot 106 do not have an associated sharpening element. The spare knife slot 104 in this example also does not include a dedicated sharpening element 170. This is so the consumer can add a knife with a serrated edge to the cutlery set, if desired.

In the disclosed example, each of the Santoku knife 30, the utility knife 32, the paring knife 34, and the chef's knife 36 has a straight cutting edge 56, 64, 70, and 76, respectively. Each of these blades 54, 62, 68, and 74 can be sharpened using a conventional sharpening element and technique. Thus, each of the corresponding slots 108, 112, 114, and 116 has an associated sharpening element 170 in the disclosed cutlery set 20. As shown in FIGS. 4, 5, and 10A, the sharpening elements 170 are positioned so that a substantial majority or the entirety of the corresponding cutting edges can contact the sharpening stones 176, 182 during insertion and withdrawal of a knife from its storage slot. With reference to FIG. 5, the Santoku knife 30, Santoku knife slot 108 (and entire storage slot), and the associated or respective sharpening element 170 are aligned and positioned so that the sharpening stones 176, 182 rest adjacent or very near the heel H of the cutting edge 56 when the knife is stored in its specific storage slot. As a result, the stones 176, 182 can very easily, and almost assuredly will, contact the cutting edge 56 of the blade 54 on the Santoku knife 30 as it is inserted or withdrawn from its respective storage slot.

As noted above, each of the storage slots with an associated sharpening element 170 can be specifically configured in length, width, and/or height to accept a particular one of the cutlery implements of the set 20. In one example, the size of the openings 132, 134, 136, and 138 in the face plate 124 (and/or the size of the holes 162, 164, 166, 168 in the cover plate) may help a user determine which cutlery implement should be stored in which storage slot. This might work well for the larger knives, which won't fit in the smaller sized storage slots. However, this might not work as well if a user inserts a smaller knife in a larger sized storage slot because the knife will fit even though the larger storage slot is not the correct slot for that particular knife. Thus, the cutlery set 20 can be provided with indicia that will indicate to a consumer which particular cutlery implement should be stored in which particular storage slot. The indicia can be used for all of the implements and storage slots of the cutlery set 20, or can be provided only for a sub-set that includes the storage slots with a dedicated sharpening element 170.

One example of indicia used in such a manner is shown in FIGS. 1, 2, and 5. Alphanumeric letters are applied in this example to the butt Y of the handles 52, 60, 66, and 72 of the Santoku knife 30, utility knife 32, paring knife 34, and chef's knife 36. The Santoku knife is marked with the letter A, the utility knife is marked with the letter B, the paring knife is marked with the letter C, and the chef's knife is marked with the letter D. The cover plate 160 also includes matching indicia adjacent each of the storage slot holes 162, 164, 166, and 168. The cover plate indicia can be identical to the indicia on the knives or can at least have the same identifying criteria, as in this example. The Santoku knife storage slot hole 162 is marked with the phrase "Knife A", which matches the letter A on the Santoku knife handle 52. Likewise, the utility knife storage slot hole 164 is marked with "Knife B" to match the letter B on the utility knife handle 60. The paring knife storage slot hole is marked with "Knife C" to match the letter C on the paring knife handle 66. The chef's knife storage slot hole 168 is marked with "Knife D" to match the letter D on the chef's knife handle 72. The user can match the indicium on the butt Y of a particular knife handle to the corresponding indicium on the cover plate 160 for the correct storage slot when trying to determine the storage slot in which to place and store a particular one of the knives.

Figure 12:
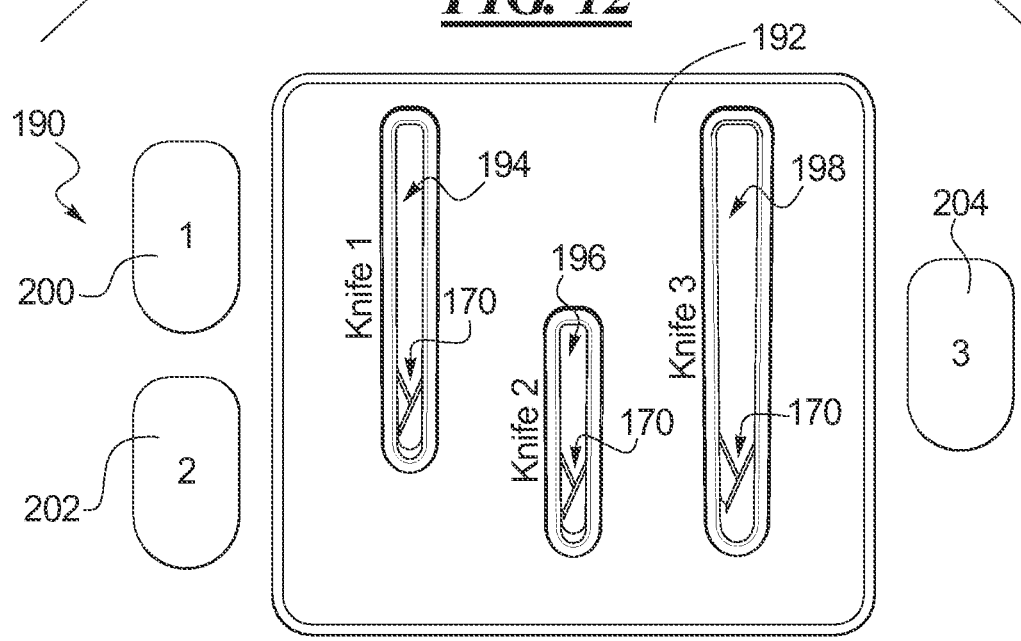
FIG. 12 shows a top view of at least a portion of another example of a cutlery set constructed in accordance with the teachings of the present disclosure and having alternate indicia on the knives and the knife block.
Figure 13:
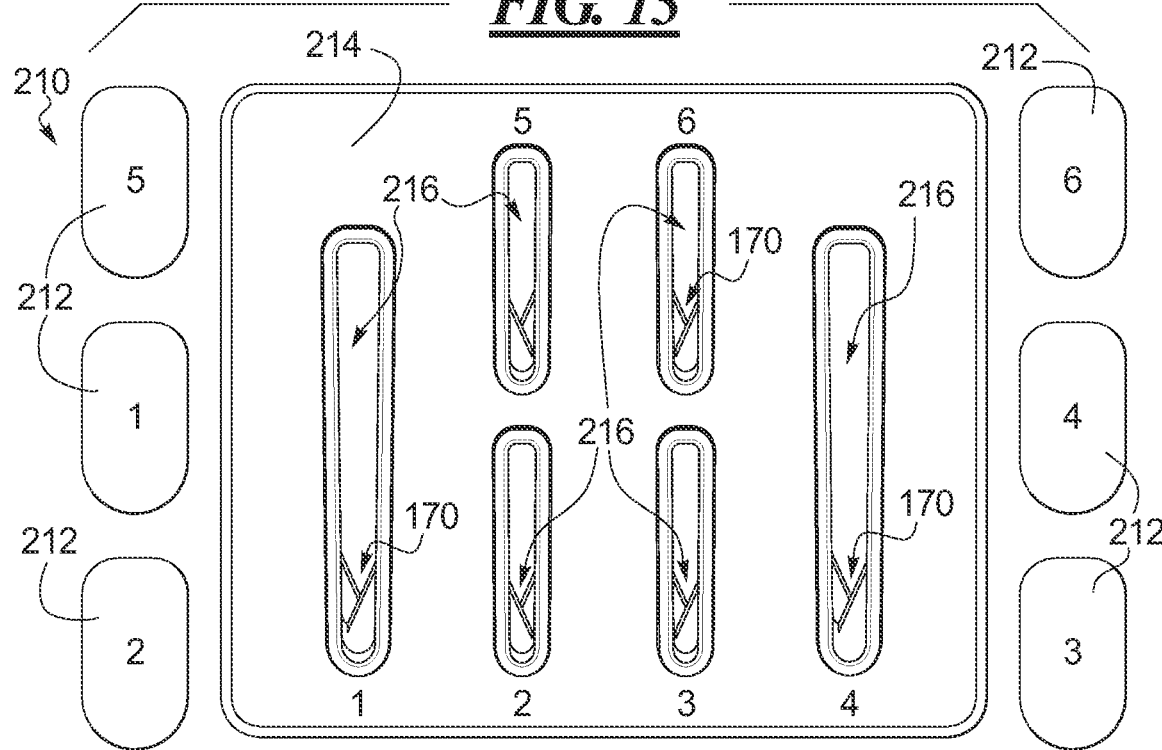
FIG. 13 shows a top view of at least a portion of another example of a cutlery set constructed in accordance with the teachings of the present disclosure and having alternate indicia on the knives and the knife block.

The form of indicia used can vary within the spirit and scope of the present disclosure. The indicia can be single or multiple symbols, pictures, numbers, letters, combinations thereof, or the like. FIG. 12 shows one example of a cutlery set 190, which has a knife receiving surface 192 on a knife block with three storage slots 194, 196, and 198, each with an associated sharpening element 170 aligned therewith. The cutlery set 190 also has three knives 200, 202, and 204. In this example, each knife is shown having numeric indicia with the knife 200 marked with the number 1, the knife 202 marked with the number 2, and the knife 204 marked with the number 3. Similar to the prior embodiment, the knife receiving surface 192 (either directly on the block, on an insert face plate, on a cover plate, or the like) is marked with matching, though not identical, indicia using a combination of letters and numbers. The storage slot 194 for the knife 200 is marked with "Knife 1", the storage slot 196 for the knife 202 is marked with "Knife 2" and the storage slot 198 for the knife 204 is marked with "Knife 3" on the surface adjacent each slot. FIG. 13 shows another example of a cutlery set 210 that includes six knives 212, a knife receiving surface 214 on a knife block, and six corresponding knife storage slots 216. The indicia are identical on both the knives 212 and the knife receiving surface 214. In this example, the indicia utilize only the numbers 1-6 on each of the knives 212 and adjacent each of the storage slots 216. In this example, all six of the storage slots 216 also have a dedicated sharpening element 170 aligned with the slot. Again, it may be that only one knife or only first and second knives (of a three or more knife set) and only one slot or only first and second slots (of three or more storage slots) of a cutlery set are provided with matching indicia. It may also be that each and every implement and slot are provided with corresponding or matching indicia, though some of the storage slots do not have a dedicated sharpener element.

Figure 14:
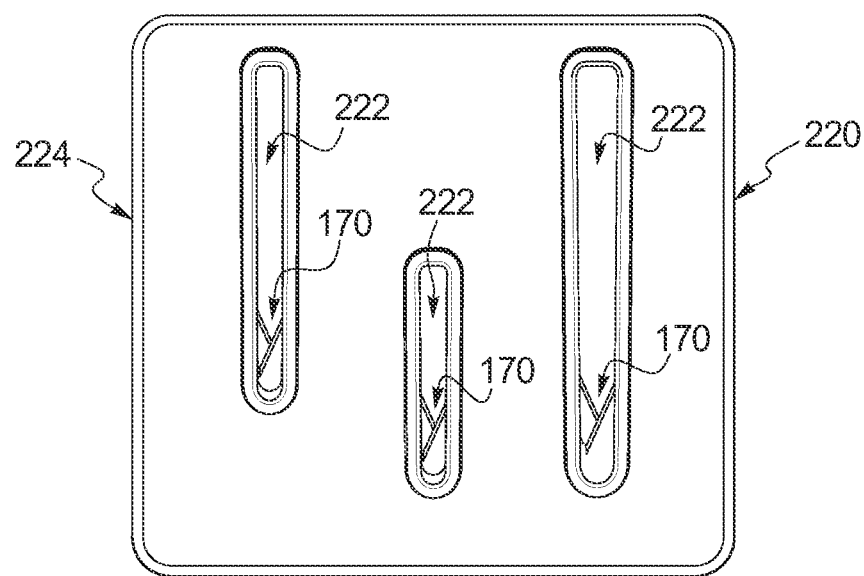
FIG. 14 shows a top view of at least a portion of another example of a knife block constructed in accordance with the teachings of the present disclosure.
Figure 15:
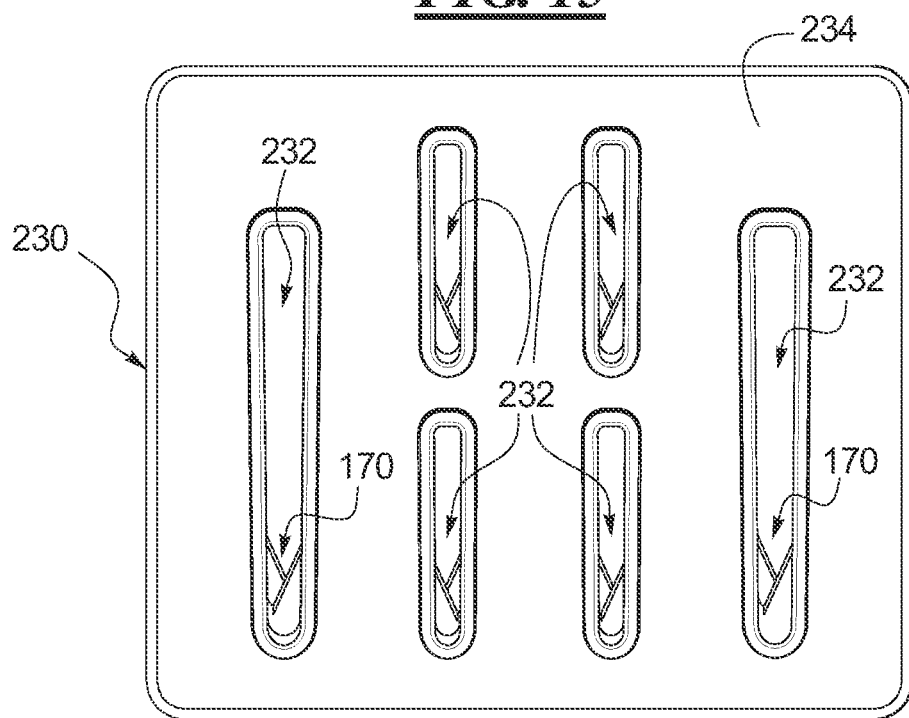
FIG. 15 shows a top view of at least a portion of another example of a knife block constructed in accordance with the teachings of the present disclosure.

As noted above, the cutlery sets disclosed herein can vary with regard to the number and type of cutlery implements. As a result, the knife block can vary in the number of the storage slots for the implements. Also, the arrangement of the storage slots on the knife block can also vary from the examples shown and described herein. For example, FIG. 14 shows a top side view of a knife block 220 with only three storage slots 222 formed in a surface 224 of the block. The three storage slots 222 are also arranged in a different pattern compared to the earlier embodiment. FIG. 15 likewise shows a top side view of another example of a knife block 230 with six storage slots 232 formed in a surface 234 of the block. The six storage slots 232 are arranged in another different pattern in comparison to the earlier embodiments.

As will be evident to those having ordinary skill in the art upon reading this disclosure, the disclosed cutlery sets can vary considerably in the number, size, location, arrangement, and the like with regard to the knife storage slots and cutlery implements. Also, the surfaces 224 and 234 in FIGS. 14 and 15 can define an entire top side of the knife blocks 22, 230 or can represent only a surface portion or segment of a larger block.

Figure 16:
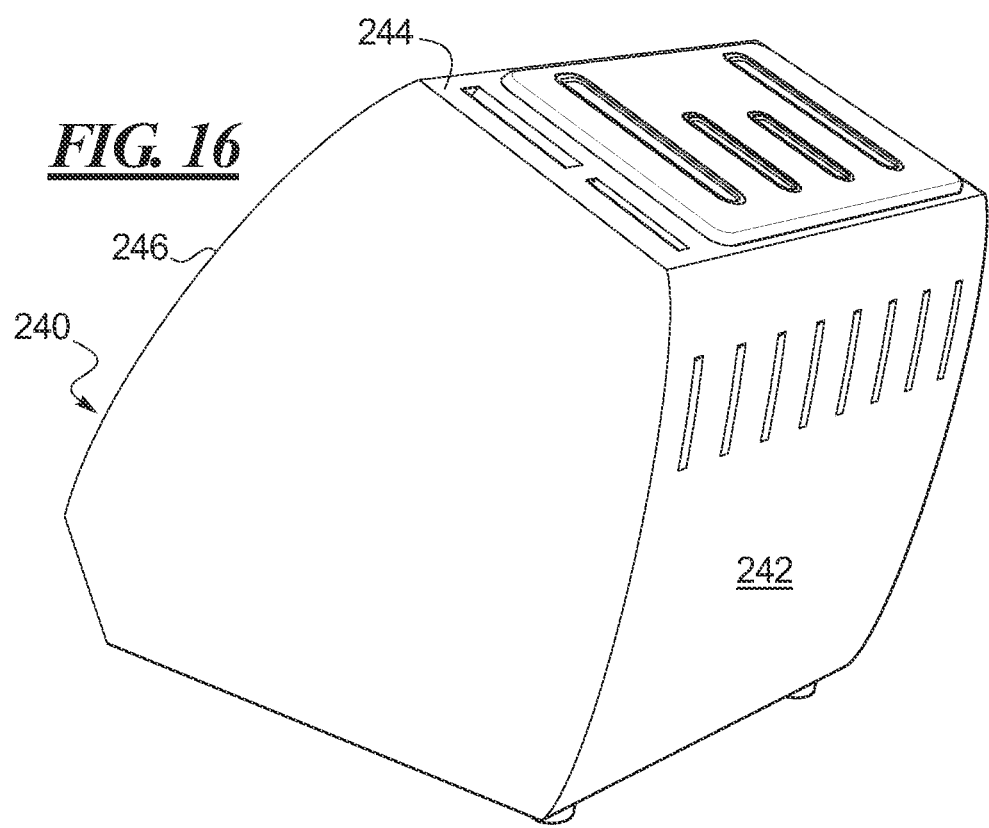
FIG. 16 shows a top, front, and right side perspective view of another example of a knife block constructed in accordance with the teachings of the present disclosure.
Figure 17:
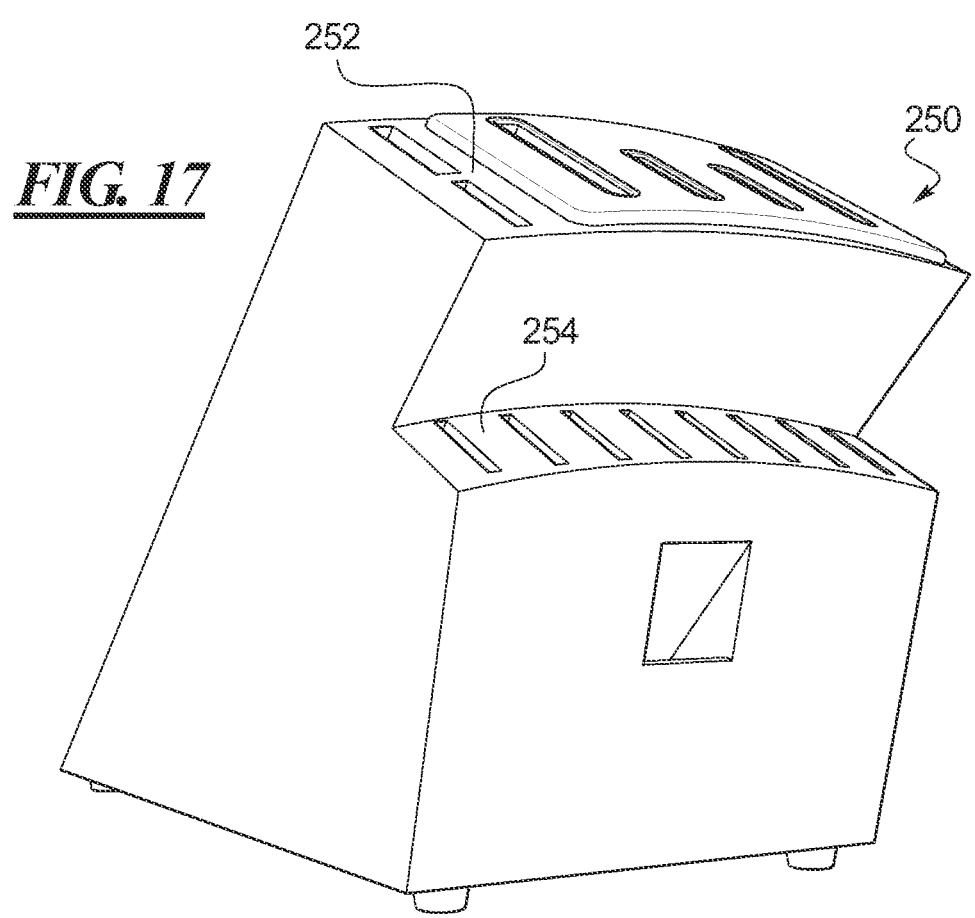
FIG. 17 shows a top, front, and right side perspective view of another example of a knife block constructed in accordance with the teachings of the present disclosure.

Also as noted above, the size, shape, configuration, and construction of the disclosed knife blocks can also vary within the spirit and scope of the present disclosure. FIGS. 16 and 17 illustrate just two of many possible alternate examples of such knife blocks. Each is illustrated using essentially the same number and arrangement of knife storage slots as the knife block 22. FIG. 16 shows a knife block 240 with a plurality of steak knife slots 26 provided directly in a front 242 of the block instead of on a step or a part of a top side of the block. The remaining storage slots are provided in a lone knife receiving surface 244 on the top side of the block. Also, a back 246 of the knife block 240 is curved, not planar or flat. FIG. 17 shows a knife block 250 with an upper knife receiving surface 252 and a lower knife receiving surface 254, similar to the knife block 22. However, in this example, the knife receiving surfaces 252 and 254 are convexly curved upward, lot flat or planar. As will be evident to those having ordinary skill in the art upon reading this disclosure, the disclosed knife blocks can vary considerably in the size, shape, contour, curvature, angle, number of surfaces, angle or orientation of surfaces, and the like.

The disclosed knife blocks and cutlery systems aim to solve or improve upon the issue of maintaining a knife's edge over the life of the knife. This is accomplished by have an integrated sharpener element, such as a ceramic sharpener, in one or more of the specific knife storage slots. The cutting edge of the knife is sharpened when it is removed from and/or inserted into its specific storage slot in the knife block. Providing a dedicated, fixed position sharpener element integrated into the storage slot where a particular knife is stored allows the act of sharpening the knife to become part of normal use of the knife (i.e. not a separate step that must be selectively performed by the consumer). The sharpener elements or each sharpener element can be specifically designed for a particular knife and can be included with the cutlery set. Sharpening of the knives associated with a slot having a sharpening element is thus optimized in a very effective manner for such knives. The consumer need not become aware of when the knife needs to be sharpened. Sharpening occurs upon the simple and regular act of withdrawing or inserting the knife in its particular storage slot.

In one example, the disclosed cutlery sets can include a wooden knife block designed to hold and store a specific set of knives. The sets can be comprised of many different varieties and types of implements, such as a 6 piece set, a 9 piece set, a 12 piece set, or the like. The knife block has a recess cut out or otherwise formed on the front or tops side face. The recess is used to mount an injection molded part (insert assembly) that contains or carries all of the sharpener elements for a given cutlery set. The insert assembly is then attached to the wooden block. Screws or other fasteners can be used to pass through bores 260 (see FIG. 9). The cosmetic faceplate or cover plate is then fixed to the face plate of the insert assembly, which can hide the fasteners and protect the knife block substrate material against scratches from the knives.

The wooden knife block in one example can be designed in such a way that the orientation of the knives is as close to 45° as possible relative to a horizontal reference. This can facilitate easier engagement of the knives with the sharpener elements under force of gravity while reducing the possibility of the block tipping over with the added forces that might result from the act of sharpening.

The insert assembly can house or define various configurations of knife storage sub-slots depending on the particular cutlery set. These sub-slots are oriented vertically in a side-to-side direction to facilitate knife engagement with the sharpener elements and to avoid bias towards left-handed or right-handed users. In the disclosed examples, all of the storage slots that have a dedicated sharpener element are housed in the single insert assembly and can be sized specifically to fit a particular knife in that cutlery set. It is possible for a given knife block to employ two or more such insert assemblies. It is also possible for a given knife block to have one or more sharpener elements mounted directly to or within the knife block, separate from any insert assembly. However, providing a consolidated insert assembly as one part can make manufacture and assembly of the cutlery set easier and less cumbersome.

Each storage slot that has an associated sharpener element in one example can employ a pair of white ceramic sharpeners or stones. Each sharpener can have a Rockwell hardness that is greater than that of the steel or other material of the knife blades of the cutlery set. The ceramic sharpeners or stones can be oriented in a manner such that they form a V-shape that is aligned with the given storage slot. The angle formed by the two stones can be referred to as the included angle or "sharpener angle". This sharpener angle can be determined and selected such that it can accommodate the manufacturing variation of the corresponding edge angles on the knives. As noted above, each sharpener element can have a different included angle, if needed. Also as noted above, each sharpener angle can be greater than the blade edge angle of the corresponding knife.

As noted above, serrated knives (bread knife, serrated utility knife, steak knife) are typically not sharpened or honed. If any such knives are included in a cutlery set, the knife block can have storage slots for these types of knives with no sharpener element provided. These types of knives typically must be sharpened by a professional using particular techniques and sharpening tools.

The disclosed insert assembly can have a lip or flange around the perimeter of the assembly. The lip can serve to properly locate and position the insert assembly in the recess to a particular depth by lying on the plane of the knife receiving surface of the knife block. Also, the insert assembly and recess opening in the block can be configured so as to properly align the sub-slots of the assembly with the storage slots of the knife block. The insert assembly can also hide any variations and imperfections in the material of the knife block, such as those caused by manufacturing a recess in a wooden block.

The cover plate, regardless of the material used or the manufacturing process used, can also be labeled with the indicia using any suitable process, such as via in-molding, screen printing, pad printing, chemical etching, or the like. Each label or slot indicia can then correspond to a matching label or knife indicia on the butt end of each knife. This type of labeling or indicia can give a user a visual clue as to where each knife is supposed to be stored in the knife block, helping to avoid improper placement and storage.

Although certain cutlery sets, sharpener elements, and knife block features and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

That which is claimed is:

1. A knife block set comprising:
   a block body comprising a first surface;
   a recessed portion extending into the block body, the recessed portion at least partially defined by a second surface that is recessed into the block body with respect to the first surface;
   a removable block insert positioned at least partially within the recessed portion, the block insert comprising a top side, a bottom side and a first knife slot extending from the top side to the bottom side;
   a removable cap comprising a first cavity, wherein the removable cap is positioned along the bottom side of the removable block insert between the second surface and the removable block insert and adjacent to the first knife slot;
   at least a first knife sharpener positioned at least partially between the block insert and the removable cap, wherein at least a portion of the first knife sharpener is received within the first cavity of the removable cap, wherein the first knife slot is sized such that a first knife is sharpened by the first knife sharpener each time the first knife is removed from the first knife slot; and
   a first knife storage slot extending through the second surface, the first knife storage slot aligned with the first knife slot;
   wherein the first knife sharpener includes two sharpening elements, which form a sharpener angle that is greater than a blade edge angle of the first knife.

2. The knife block set according to claim 1, wherein the first knife sharpener is positioned to contact the blade edge when the first knife is inserted into the first knife slot, withdrawn from the first knife slot, or both.

3. The knife block set according to claim 1, wherein the first knife storage slot and a second knife storage slot each extend an equal length into the block body.

4. The knife block set according to claim 1, wherein the first surface is parallel to the second surface.

5. The knife block set according to claim 1, further comprising the first knife with a first blade height, wherein the first knife slot has a slot height substantially equal to the first blade height.

6. The knife block set according to claim 1, wherein the first knife storage slot is oriented lengthwise at a first angle within the block body relative to a horizontal reference, the first angle being between 40 degrees and 55 degrees.

7. The knife block set according to claim 6, wherein the first angle is 45 degrees.

8. The knife block set according to claim 1, wherein the knife block has at least a second knife sharpener along a second knife storage slot, the second knife sharpener configured to contact a blade of a knife stored in the second knife storage slot, and wherein each of the first and the second storage slots have at least a length into the block body, a width across the block body, or a height along the block body that is different than the other of the first and second storage slots.

9. The knife block set according to claim 1, further comprising a second knife storage slot extending through the second surface of the block body, wherein the second knife storage slot does not have a second knife sharpener aligned with the second knife storage slot.

10. The knife block set according to claim 1, wherein the block insert is mounted in the recessed portion; and
wherein the first knife sharpener is removably attached to the block insert.

11. The knife block set according to claim 1, further comprising first indicia on the first surface of the block body, the first indicia associated with a first opening and relating to one or more knife characteristics.

12. A cutlery set comprising:
a knife block having a block body and a first storage slot extending through a face of the block body;
a removable block insert positioned at least partially within the block body, the block insert comprising a top side, an opposing bottom side, and at least a first knife storage slot extending through the removable block insert;
a removable cap comprising a first cavity, wherein the removable cap is positioned along the bottom side of the block insert between the face of the block body and the block insert;
at least a first knife sharpener positioned at least partially between the block insert and the removable cap and aligned with the first storage slot and the first knife storage slot, the first knife sharpener including two sharpening elements that form a V-shape and have a sharpener angle; and
a first knife having a first blade and a first handle, the first blade having a knife edge with a blade angle, wherein the first storage slot is sized to receive the first blade, and wherein the first blade is sharpened by the first knife sharpener each time the first blade is inserted into the first storage slot;
wherein the sharpener angle is greater than the blade angle, and the first knife sharpener contacts and sharpens the knife edge of the first blade.

13. The cutlery set according to claim 12, further comprising a second storage slot, wherein the first storage slot has at least one size characteristic that is different from the second storage slot.

14. The cutlery set according to claim 13, wherein the at least one size characteristic is one or more of a length into, a width across, or a height along the block body.

15. The cutlery set according to claim 13, wherein the first storage slot is oriented at a first angle relative to a horizontal reference and the second storage slot is oriented at a second angle relative to the horizontal reference.

16. The cutlery set according to claim 15, wherein the first and second angles are the same and between 40 degrees and 55 degrees relative to the horizontal reference.

17. The cutlery set according to claim 16, wherein the first and second angles are between 42 degrees and 48 degrees relative to the horizontal reference.

18. The cutlery set according to claim 12, further comprising a second knife with a second blade, wherein the first blade has at least one size characteristic that is different than the second blade.

19. The cutlery set according to claim 18, wherein the at least one size characteristic is one or more of a blade length, a blade width, or a blade height.

20. The cutlery set according to claim 12, further comprising:
wherein the block insert is mounted to a face of the block body; and
wherein the first storage slot is aligned with the first knife storage slot in the block insert.

21. The cutlery set according to claim 12, further comprising a faceplate of the knife block disposed along the top side of the block insert and covering the block insert, the faceplate having a first opening aligned with the first knife storage slot of the block insert.

22. The cutlery set according to claim 12, further comprising:
a first knife indicium visibly carried on a portion of the first knife and indicating a characteristic of the first knife; and
a first block indicium visibly carried on a portion of the knife block and associated with the first storage slot, the first block indicium matching the characteristic of the first knife indicated by the first knife indicium.

23. The cutlery set according to claim 22, wherein the first knife indicium is carried on an end of the first handle.

24. The cutlery set according to claim 22, wherein the first block indicium is provided adjacent a first opening on a faceplate.

25. The cutlery set according to claim 12, wherein the first knife sharpener can contact and sharpen a knife edge of the first blade when the first knife is inserted into and withdrawn from the first storage slot.

26. A cutlery set according to claim 12, further comprising a face angle defined by the face of the block body and a bolster angle defined by the first handle, the bolster angle being the same as the face angle.

27. A cutlery set comprising:
a knife block having a block body with a recessed portion;
a set of knives including at least a first knife having a first blade and a second knife having a second blade;
an array of storage slots including at least a first storage slot and a second storage slot each extending through a face of the block body, the first storage slot specifically sized to receive the first blade and the second storage slot specifically sized to receive the second blade;
a block insert positioned at least partially within the recessed portion of the block body, the block insert comprising a top side, an opposing bottom side, a first sub-slot through the block insert aligned with the first storage slot, and a second sub-slot through the block insert aligned with the second storage slot; and
at least a first knife sharpener disposed along the bottom side of the block insert and coupled to the block insert, the first knife sharpener arranged specifically to sharpen a knife edge on the first blade each time the first knife is inserted into or withdrawn from the first slot; wherein the first knife sharpener includes two sharpening elements, which form a sharpener angle of the first knife sharpener that is greater than a blade angle of the knife edge.

28. The cutlery set according to claim 27, wherein the first blade and the second blade are different from one another in at least one of a blade length, a blade width, or a blade height.

29. The cutlery set according to claim 27, wherein the first and second storage slots are different from one another in at least one of a slot length, a slot width, or a slot height.

30. The cutlery set according to claim 27, wherein the first knife and the second knife are different from one another in at least one blade characteristic.

31. The cutlery set according to claim 30, further comprising:
a first knife indicium visibly carried on a portion of the first knife;
a second knife indicium visibly carried on a portion of the second knife, the second knife indicium being different from the first knife indicium;

a first block indicium visibly carried on a portion of the knife block and matching the first knife indicium, the first block indicium associated with the first storage slot; and a second block indicium visibly carried on a portion of the knife block and matching the second knife indicium, the second block indicium associated with the second storage slot.

\* \* \* \* \*